United States Patent
Kawato et al.

(10) Patent No.: US 7,813,079 B2
(45) Date of Patent: *Oct. 12, 2010

(54) THIN FILM PERPENDICULAR MAGNETIC RECORDING HEAD, THEIR FABRICATION PROCESS AND MAGNETIC DISK DRIVE USING IT

(75) Inventors: Yoshiaki Kawato, Sendai (JP); Kazuhiro Nakamoto, Odawara (JP); Hiroyuki Hoshiya, Odawara (JP); Yasuyuki Okada, Odawara (JP); Masafumi Mochizuki, Koganei (JP)

(73) Assignee: Hitachi Global Storage Technologies Japan, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/255,306

(22) Filed: Oct. 21, 2008

(65) Prior Publication Data

US 2009/0059425 A1 Mar. 5, 2009

Related U.S. Application Data

(63) Continuation of application No. 11/802,297, filed on May 22, 2007, now Pat. No. 7,532,433, which is a continuation of application No. 10/644,022, filed on Aug. 20, 2003, now Pat. No. 7,221,538.

(30) Foreign Application Priority Data

Jan. 22, 2003 (JP) .............................. 2003-012988
Jul. 15, 2003 (JP) .............................. 2003-196859

(51) Int. Cl.
 G11B 5/147 (2006.01)
 G11B 5/127 (2006.01)
(52) U.S. Cl. ........................... 360/125.08; 360/125.12; 360/125.04

(58) Field of Classification Search ............ 360/125.08, 360/125.12, 125.04
See application file for complete search history.

(56) References Cited

U.S. PATENT DOCUMENTS 4,907,113 A 3/1990 Mallary (Continued)

FOREIGN PATENT DOCUMENTS

JP 60-136007 A 7/1985

(Continued)

OTHER PUBLICATIONS

Iwasaki, Shun-ichi, Perpendicular Magnetic Recording—Evolution and Future, IEEE Transactions on Magnetics, vol. Mag-20, No. 5, Sep. 1984, pp. 657-662.

(Continued)

*Primary Examiner*—William J Klimowicz
(74) *Attorney, Agent, or Firm*—Antonelli, Terry, Stout & Kraus, LLP.

(57) ABSTRACT

Thin film perpendicular magnetic head with a narrow main pole capable of a high recording density in excess of 100 gigabits per square inch and generating a high magnetic recording field, while also being modified to suppress remanent magnetic fields occurring immediately after writing operation. A return path is provided for supplying a magnetic flux to the main pole, and an conductive coil for excitation of the main pole and return path. The main pole has a pole width of 200 nanometers or less, and a magnetic multilayer made up of a high saturation flux density layer and low saturation flux density layer. The low saturation flux density layer and the high saturation flux density suppress remanent magnetization and prevent erasing after writing by utilizing a closed magnetic domain structure in the pole.

10 Claims, 20 Drawing Sheets

U.S. PATENT DOCUMENTS

| | | |
|---|---|---|
| 6,641,935 B1 | 11/2003 | Li et al. |
| 6,791,796 B2 | 9/2004 | Shukh et al. |
| 6,835,475 B2 | 12/2004 | Carey et al. |
| 7,057,837 B2 | 6/2006 | Gill |
| 7,057,853 B2 * | 6/2006 | Okada et al. ............ 360/125.12 |
| 7,221,538 B2 * | 5/2007 | Kawato et al. .......... 360/125.04 |
| 7,532,433 B2 * | 5/2009 | Kawato et al. .......... 360/125.08 |
| 2003/0076629 A1 | 4/2003 | Minor |
| 2003/0133223 A1 | 7/2003 | Minor |
| 2003/0133224 A1 | 7/2003 | Minor et al. |
| 2003/0197976 A1 | 10/2003 | Van der Heijden et al. |
| 2004/0066576 A1 | 4/2004 | Lee et al. |
| 2004/0120074 A1 | 6/2004 | Okada et al. |
| 2004/0252415 A1 | 12/2004 | Shukh et al. |
| 2005/0135005 A1 | 6/2005 | Im |
| 2006/0044680 A1 | 3/2006 | Liu et al. |
| 2008/0304176 A1 * | 12/2008 | Takagishi et al. .............. 360/86 |

FOREIGN PATENT DOCUMENTS

| | | |
|---|---|---|
| JP | 61-217901 A | 9/1986 |
| JP | 03-049008 A | 3/1991 |
| JP | 03-132005 | 6/1991 |
| JP | 05-054320 A | 3/1993 |
| JP | 06-195636 A | 7/1994 |
| JP | 07-135111 A | 5/1995 |
| JP | 62-093915 | 4/1997 |
| JP | 11-149620 A | 6/1999 |
| JP | 2001-052313 A | 2/2001 |
| JP | 2001-291212 A | 10/2001 |
| JP | 2002-100007 A | 4/2002 |
| JP | 2002-324303 A | 11/2002 |

OTHER PUBLICATIONS

Cain, William et al., Challenges in the Practical Implementation of Perpendicular Magnetic Recording, IEEE Transactions on Magnetics, vol. 32, No. 1, Jan. 1996, 97-102.

Iwasaki, Shun-ichi, Perpendicular Magnetic Recording - Evolution and Future, IEEE Transactions On Magnetics, vol. Mag-20, No. 5, Sep. 1984, pp. 657-662.

Cain, William et al., Challenges in the Practical Implementation of Perpendicular Magnetic Recording, IEEE Transactions on Magnetics, vol. 32, No. 1, Jan. 1996, 97-102.

Trouilloud, Philip et al., Magnetic Properties of Copper Laminated CoFeCu Films Deposited From a Single Plating Bath by Current Modulation, Abstract No. 582, Oct. 22, 2000.

* cited by examiner

CORRESPONDING TO THE COERCIVITY OF MEDIA REQUIRED FOR 100Gb/in2 RECORDING

CHANGE IN OUTPUT (%)

NUMBER OF RECORDING OPERATION
OVERSHOOT 130%

NUMBER OF RECORDING OPERATION
OVERSHOOT 70%

THIN FILM PERPENDICULAR MAGNETIC RECORDING HEAD, THEIR FABRICATION PROCESS AND MAGNETIC DISK DRIVE USING IT

CROSS-REFERENCE TO RELATED APPLICATION

This application is a Continuation application of application Ser. No. 11/802,297, filed May 22, 2007, now U.S. Pat. No. 7,532,433, which is continuation of U.S. patent application Ser. No. 10/644,022, now U.S. Pat. No. 7,221,538, filed Aug. 20, 2003, which claims priority from Japanese patent applications JP 2003-196859, filed on Jul. 15, 2003, and JP 2003-012988, filed on Jan. 22, 2003, the contents of which are incorporated herein by reference in their entirety.

BACKGROUND OF THE INVENTION

1. Field of the Invention

The present invention relates to a thin film perpendicular magnetic recording head, their magnetic head fabrication process and magnetic disk drive for a highly reliable magnetic head with stable operation capable of generating a high magnetic recording field even on narrow tracks for high density magnetic recording.

2. Description of Related Art

In recent years, digitalization of diverse media has been making rapid progress along with advancements in information processing technology. Besides personal computers and servers, home appliance and audio devices must store huge amounts of digital information, creating an increasing demand greater than ever before for large capacity magnetic disk drives forming the core of non-volatile file systems. Large capacity disk drives in other words signifies recording on a medium with a higher bit density or in other words, a higher areal recording density.

A method called longitudinal magnetic recording is the generally used method for actual recording on magnetic disk drives. The longitudinal magnetic recording utilizes as a recording medium, a ferromagnetic layer possessing large magnetic coercivity in a direction parallel to the disk substrate surface, and records information by magnetizing the recording medium along the substrate area surface. In this case, an inverse magnetized section formed to face the longitudinal magnetization at a 180 degree angle is the bit 1.

In order to increase the longitudinal recording density, both the bit density towards the disk periphery (linear recording density) and the bit density radially along the disk (track density) must be simultaneously increased. Increases in the track density are limited by the pole width forming process for the read/write head and by the mechanism for positioning accuracy. However these factors are nothing more than technical issues. Increases in the linear recording density however are subject to basic restrictions due to the fact that the recording medium is an aggregate of ferromagnetic particles.

In the longitudinal magnetic recording method, magnetized sections that mutually oppose one another are mainly magnetic reversals. Near these magnetic reversals, large internal magnetic fields called demagnetization fields occur in a direction diminishing the magnetization. Transition areas or in other words, areas not having a high enough magnetic value are formed in a finite width in these magnetic reversals by the demagnetization fields.

Problems such as shifts in the actual position of the magnetic reversal occur when adjoining magnetic transition areas interfere with each other in locations when the bit length is short. These problems make it necessary to reduce the magnetic transition areas to at least a size smaller than the bit length. Increasing the linear recording density therefore requires a property on the medium where magnetization overcomes the demagnetization field. More specifically, along with improving the magnetic coercivity of the medium, the thickness of the magnetic recording layer must be reduced to suppress the demagnetization field.

The linear recording density is therefore greatly restricted by the magnetic properties and structure of the medium.

In the standard longitudinal recording, the ratio of linear recording density to track density is preferably about 5 to 10 times. To attain a recording density of 100 gigabits per square inch ($10^{11}$ bits per square inch) based on this condition, the bit length towards should be made about 25 nanometers in the peripheral direction of the disk. However, estimating the properties required of a medium with a magnetic reversal width of 25 nanometers or less on a simple model, reveal that required conditions are a medium layer thickness of 15 nanometers or less and a magnetic coercivity of 5 kOe (oersted).

On the other hand, even under the precondition that the magnetic (recording) field generated by the write element in longitudinal recording has a saturated flux density (hereafter Bs) of 2.4 T (tesla) which is the maximum preferred level usable in a magnetic pole material, the upper figure will still be limited to 9 kOe. In this case, when the magnetic coercivity of the recording layer of the medium exceeds 5 kOe, obtaining a magnetic recording field strong enough to magnetize the medium is difficult. When the magnetic layer thickness of the cobalt alloy magnetic layer is below 15 nanometers, the actual volume of crystal grain becomes small so that the magnitude of the thermal energy (in other words, energy agitating the magnetization) can no longer be ignored compared to the anisotropic energy (in other words, energy for stabilizing the magnetization in a fixed direction) of the individual particles. The thermal fluctuation becomes drastic, causing the problem that thermal decay reduces the magnitude of the record magnetization as time passes. To suppress this thermal decay, the magnetic coercivity must be further increased or the volume of the crystal grains increased.

However as described above, there is an upper restriction on the allowable magnetic coercivity when the magnetic field of the head is limited. Furthermore, increasing the layer thickness in order to increase the volume of the crystal grains signifies an increase in the magnetic transition area due to an increase in the demagnetization field or in other words, means a drop in the allowable linear recording density.

However, attempting to attain a sufficient volume for the crystal grains longitudinally, increases the randomness of the magnetization distribution within the medium, leading to increased noise in the medium and preventing a sufficient S/N (signal-to-noise) ratio from being obtained. Therefore, achieving longitudinal recording in excess of an areal recording density of 100 gigabits per square inch while satisfying the conditions for thermal decay, low noise and sufficient recording is predicted to be basically difficult.

The perpendicular recording has been proposed to resolve these basic problems. The perpendicular (magnetic) recording is a method for magnetizing the thin-film layer in a direction perpendicular to the layer surface and its recording principle is basically different from the longitudinal recording of the related art. In the perpendicular (magnetic) recording, the particles are magnetized in a antiparallel configuration so adjacent magnetized particles are not made to face each, and therefore the perpendicular recording is not so affected by demagnetization fields. Perpendicular recording may therefore allow making the magnetic transition states extremely narrow and also make it easier to boost the linear recording density. Perpendicular recording can also be highly resistant to magnetic decay for the same reason, since the requirements for the medium thin-film as not as stringent as those for longitudinal recording.

As perpendicular magnetic recording is gathering attention as an ideal method for high density magnetic recording, mediums of various structures and materials combined with thin-film magnetic heads have been proposed. Perpendicular recording is composed of a method utilizing a single perpendicular magnetic layer; and comprised of a method forming adjacent flux keeper layers of low magnetic coercivity between the disk substrate and the perpendicular magnetic layer.

Perpendicular recording has the advantage that by utilizing a double layer perpendicular magnetic recording medium possessing a flux keeper layer and combining a single pole type write element (1): capable of reducing demagnetization field generated in a recording layer (2): a magnetic recording field can be generated having a steep distribution compared to the ring head utilized in longitudinal recording. This technology is for example disclosed in the non-patent document 1.

Mediums formed for example from a perpendicular magnetic layer of CoCr alloy formed on a flux keeper layer made from a soft magnetic layer such as permalloy or iron based amorphous alloy or fine crystallized alloy are under evaluation. In recent years, so-called granular mediums with fine particles of cobalt magnetic dispersed in SiO2 or superlattice layers such as Co/Pd or Co/Pt as the recording layer are also under evaluation. To stabilize magnetic domains of keeper layer, laminated layers combining with antiferromagnetic materials or magnetic multilayers which is composed of antiferromagnetically coupled ferromagnetic layers are for example being utilized.

The type of write element utilized in perpendicular recording with a perpendicular recording medium possessing a flux keeper layer is generally called a single-pole write element. This element does not use a structure of two poles facing each other via an extremely thin gap as does the so-called ring write element in longitudinal recording. Instead, the single magnetic pole (main pole) 13 as shown in FIG. 1 is characterized by a structure protruding towards the medium. To form a magnetic path however, a pole called an auxiliary pole 16 however is formed so as to put the coil 17 between them.

The auxiliary pole 16 forms a magnetic path in the path sequence of main pole 13, flux keeper layer 19, auxiliary pole 16, yokes 14, 15, and main pole 13 and is characterized in that recording can be performed with optimal efficiency. Since the magnetic flux flowing between the main pole 13 and the keep layer 19 cuts across the recording layer 18, the magnetic flux flow makes a magnetic recording field, and forms a record bit 20 in the recording layer 18.

The one serious problem unique to perpendicular recording utilizing the mutual effects of a single pole write element and magnetic flux keeper layer is the remanent magnetization of the main pole. This phenomenon is designated in non-patent document 2.

In this phenomenon called, "erase-after-write" (or erasing after write) disclosed in this document, the signal on the medium is erased by a direct current magnetic field due to remanent magnetization immediately after recording. The head in an actual magnetic disk drive is constantly moving above the disk. Therefore when this phenomenon occurs during operation, there is the possibility that data and servo information might be destroyed over an extremely wide range on the disk.

This phenomenon is a fatal defect in the reliability of the magnetic write-read system. One method to avoid this phenomenon described in patent document 1 is optimizing the shape of the yoke. This method could eliminate the problem of erasure occurring after writing in the yoke section due to remanent magnetization.

However, though there is a relatively high degree of freedom in designing the dimensions and shape of the yoke section, the pole tip which determines the width of the narrow recording track must be made small to meet the increased recording density. So it is necessary to employ a completely different means to suppress the remanent magnetization in the pole tip. One means is a method known in the related art utilizing a magnetic multilayer with a thin film (layer) of less than one micron in the main pole of the thin film magnetic head used for perpendicular recording.

A structure is disclosed in patent document 2 utilizing a magnetic multilayer in the main pole of the thin film magnetic head used for perpendicular recording. Methods are also disclosed in patent document 3, patent document 4, patent document 5 for utilizing optimal materials and layer structures to stabilize the magnetic domain in magnetic multilayers. However, these methods all have the objective of stabilizing the magnetic layer of a single magnetic domain and are inadequate or inapplicable as a means to prevent the erasure after write that is brought about by the single magnetic domain that results from making the magnetic pole smaller and narrower. The patent document 6 also discloses an example of a thin-film magnetic head utilizing a magnetic multilayer comprised of magnetic layers. However, this method can also be seen in the ring thin-film magnetic head utilized in longitudinal recording and was disclosed in technology to fix a magnetic domain for suppressing noise that accompanies changes in the structure of the magnetic domain during read operation. This structure is also different from the means for suppressing remanent magnetization in the pole tip after recording and is clearly not suitable.

The above disclosures assume as a precondition use of a material yielding comparatively satisfactory soft magnetic layer characteristics such as Ni—Fe, Fe—Ni alloy, and Fe. These disclosures are therefore unsuitable for high Bs material combinations exceeding 2.2 T such as Fe—Co alloy required for narrow tracks in the future.

[Patent document 1]
JP-A No. 291212/2001
[Patent document 2]
JP-A No. 324303/2002
[Patent document 3]
JP-A No. 54320/1993
[Patent document 4]
JP-A No. 195636/1994
[Patent document 5]
JP-A No. 135111/1995
[Patent document 6]
JP-A No. 49008/1991
[Non-patent document 1]
IEEE Transactions on Magnetics, Vol. MAG-20, No. 5, September 1984, pp. 675-662, "Perpendicular Magnetic Recording-Evolution and Future"
[Non-patent document 2]
IEEE Transactions on Magnetics, Vol. MAG-32, No. 1, January 1996, pp. 97-102, "Challenges in the Practical Implementation of Perpendicular Magnetic Recording"
[Non-patent document 3]
The 198th Meeting of the Electrochemical Society, Meeting Abstracts, No. 582

In a perpendicular recording thin film magnetic head for high density recording in excess of 100 gigabits per square inch, a strong magnetic field in excess of 10 kOe must be generated from a narrow pole tip of 200 nanometers or less in width in order to write bits clearly on a magnetic recording medium with high magnetic coercivity of 5 kOe or more.

FIG. 2 is a graph showing the magnetic recording field distribution generated by a single pole type write element in the center of the recording track and computed by the 3-dimensional finite element method. The pole width was 150 nanometers to attain the required 140 gigabits per square inch. The four curves are respectively for a saturation flux density (Bs) of 2.4 T, 2.2 T, 2.0 T, and 1.6 T.

These results revealed that a ferromagnetic alloy mainly of Fe—Co with a high Bs of 2.2 T or more is required in the pole tip in order to generate a recording magnetic field in excess of 10 kOe at the write element for a narrow track having a high recording density in excess of 100 gigabits per square inch.

FIG. 3 is a graph showing results when many perpendicular recording thin film magnetic heads manufactured in different recording pole widths using high Bs materials of this type were subjected to 100 write-read repetitions and the degree of erase-after-write then calculated using the change in output as an indicator. The vertical axis is the change in output expressed in percent of average rated output over the 100 read-write cycles. The horizontal axis expresses the magnetic pole width of each head. The heads differ from one another only in the magnetic pole width and the other parameters are all fixed parameters.

As these results clearly show, virtually no erasure-after-write occurred in heads with a magnetic pole width of 200 nanometers or more, yet the extent of erasure-after-write suddenly increased on tracks narrower than 200 nanometers. The changes in output of below 10 percent observed on magnetic pole widths of 200 nanometers or more were confirmed as almost all being due to fluctuations in the sensitivity of the read element itself.

In the related art, erasure-after-write is thought to be caused by high recording efficiency from the combination of single pole type write element and keeper layer in the medium. In other words, remanent magnetization is not as likely to occur in independent write elements because demagnetization fields in the pole occur on the surface bearing to the medium. Therefore, the magnetic flux keeper layer in the medium here acts to reduce the demagnetization field in the magnetic pole having the effect that remanent magnetization is likely to occur.

The results in FIG. 2 however clearly show that this problem occurs more frequently on narrow tracks having a drop in recording efficiency. The erasure-after-write phenomenon here is therefore a mode different from the erasure-after-write disclosed in the reference documents. This is clearly due to a completely different physical phenomenon occurring within the write element.

Magnetization of ferromagnetic material can be considered the result of an aggregate of tiny magnetic momentum called spin. This spin has the constant effect of aligning the momentum of the vector in one direction by a mutual effect called exchange coupling. The ferromagnetic material however is processed in a limited size, so in order to prevent a vast increase in magnetostatic energy emitted to outer peripheral sections, the internal sections are separated into small areas known as magnetic domains.

These different magnetic domains need not always be made to face the same direction, and these domains are placed entirely in a magnetically closed structure. The boundaries of this magnetic domain are (magnetic domain) walls of a limited width. The size is determined by the magnetostatic energy versus the exchange coupling energy from adjoining non-aligned spins so that though differing by size and shape, ferromagnets widely known as comprised mainly by iron and cobalt have a size on the order of several hundred to some thousands of nanometers. Therefore, when the scale of the magnetic material is down to a few thousands of nanometers or less, a magnetic domain wall cannot be formed, and the magnet material tends to form into single domain states.

FIG. 4 shows results of the calculated remanent magnetization found by simulating the magnetic state of the magnetic pole tip. The vertical axis expresses stray magnetic fields due to remanent magnetization. The horizontal axis expresses the magnetic pole width. These results also reveal that the remanent magnetic field suddenly increases at pole widths of 200 nanometers and below.

FIGS. 5A and 5B are conceptual views of the magnetic state of the magnetic pole tip found by the above described simulation. The arrow 55 in the drawing indicates the direction of magnetization. When the magnetic pole width is as wide as 300 nanometers (FIG. 5A), the magnetic state is in a so-called closed domain structure. However when the magnetic pole width is a narrow 100 nanometers (FIG. 5B), one can see that the magnetic state is almost entirely a single domain and therefore a large remanent magnetic field is generated.

Examining the actual magnetic state of the write elements with 300 and 120 nanometer magnetic pole widths by spin-polarized scanning electron microscopy (SEM) shows as expected, that a with a wide pole width of 300 nanometers the magnetism is separated into numerous magnetic domains having various directions of magnetization. However, in the case of the narrow pole width of 120 nanometers, the magnetization is almost completely in a single domain state. These results allow concluding that the sudden increase in erasure-after-write observed in pole widths below 200 nanometers is due to the main pole tip preferring to be a single domain state.

In magnetic poles of this small size, remanent magnetization is easily prone to occur because of the tendency for uniform magnetization so that many cases of erasure-after-write have a high probability of occurring during device operation. In addition, in high Bs material such as Fe—Co alloy, the soft magnetic properties are generally inferior to those of typical soft magnetic materials such as $Ni_{80}Fe_{20}$. In other words, large hysteresis often appears in the magnetic curve due to the dispersion of crystalline magnetic anisotropy as well as materials having a large, positive magnetorestriction coefficient that are factors in inducing remanent magnetization and therefore erasure-after-write. This signifies that remanent magnetization is large when the hysteresis of the soft magnetic material is large and when there is no excitation. In thin film magnetic heads on the other hand, materials with a positive magnetorestriction coefficient are known to possess magnetic anisotropy induced in a direction perpendicular to the surface of the medium by an effect from anisotropic stress (generally called the inverse-magnetorestriction effect). (See the example in non-patent document 3.)

Magnetization is easily faced in a long-axis direction (shape magnetic anistrophy) due to the long, narrow shape of the four-cornered cylinder which is the original shape of the main pole tip. In addition, the crystalline magnetic anisotropy also becomes stronger in a direction perpendicular to the surface of the medium because of the inverse-magnetostriction. Therefore along with the single domain state that was previously described, the problem of erasure-after-write easily tends to occur due to remanent magnetization of the magnetic pole tip.

A structure is therefore required that essentially applies no stray magnetic field to the magnetic recording medium even remanent magnetization is generated perpendicular to the surface of the medium.

The inventors perceived that remanent magnetization can be suppressed in a thin film perpendicular magnetic recording head by employing a closed domain structure for the magnetic material even in magnetic poles of extremely small size by utilizing a magnetic multilayer structure and an optimal combination of materials capable of effectively eliminating the mutual exchange effect within the magnetic material causing a single domain state.

SUMMARY OF THE INVENTION

In other words, to resolve the aforementioned problems of the related art, the thin film perpendicular magnetic recording head and magnetic disk drive of the present invention are comprised of a main pole, a return path for supplying a magnetic flux to the main pole, and a conductive coil for excitation of the main pole and the return path, wherein the main pole has a width of 200 nanometers or less, and that main pole possesses a magnetic multilayer made up of a high saturation flux density layer and low saturation flux density layer, the high saturation flux density layer contains an iron-cobalt alloy, and the direction of magnetism of a pair of the high saturation flux density layers facing each other by way of the low saturation flux density layer is an antiparallel array in the magnetic multilayer. It should be noted here that the low saturation flux density material here may comprise a non-magnetic material.

The main pole possesses a magnetic multilayer made up of a high saturation flux density layer and low saturation flux density layer and, the thickness of the low saturation flux density layer is within a range of 0.5 nanometers or more to 5 nanometers or less, and the high saturation flux density layer preferably has a thickness from 10 nanometers or more to 50 nanometers or less.

The present invention can provide a thin film perpendicular magnetic recording head and magnetic disk drive capable of preventing erasure after write since a main pole comprised of magnetic multilayer with closed domain structures is utilized to suppress remanent magnetization.

DETAILED DESCRIPTION OF THE INVENTION

Figure 1:
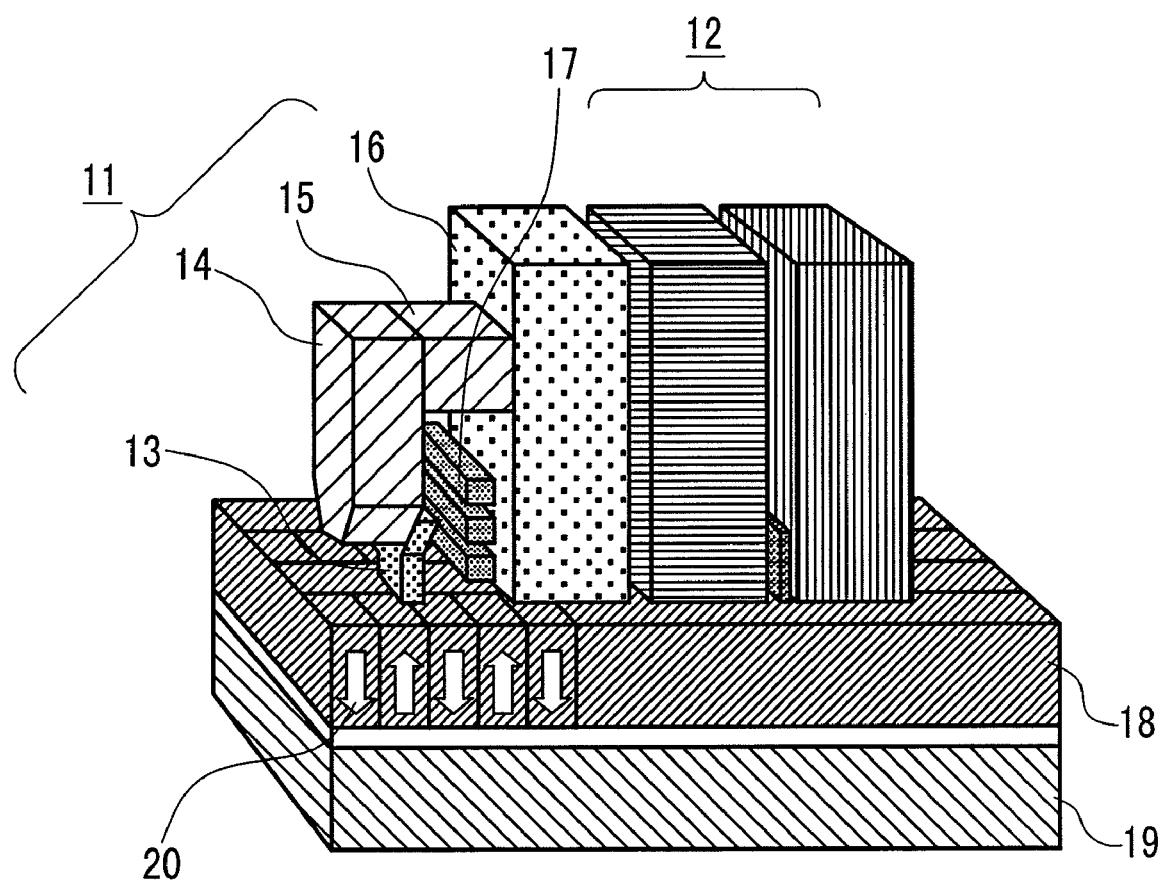
FIG. 1 is a perspective view expressing a typical structure of the perpendicular recording method and in particular the magnetic recording medium containing the flux keeper layer and thin-film magnetic head and positions of the recorded bits.
Figure 2:
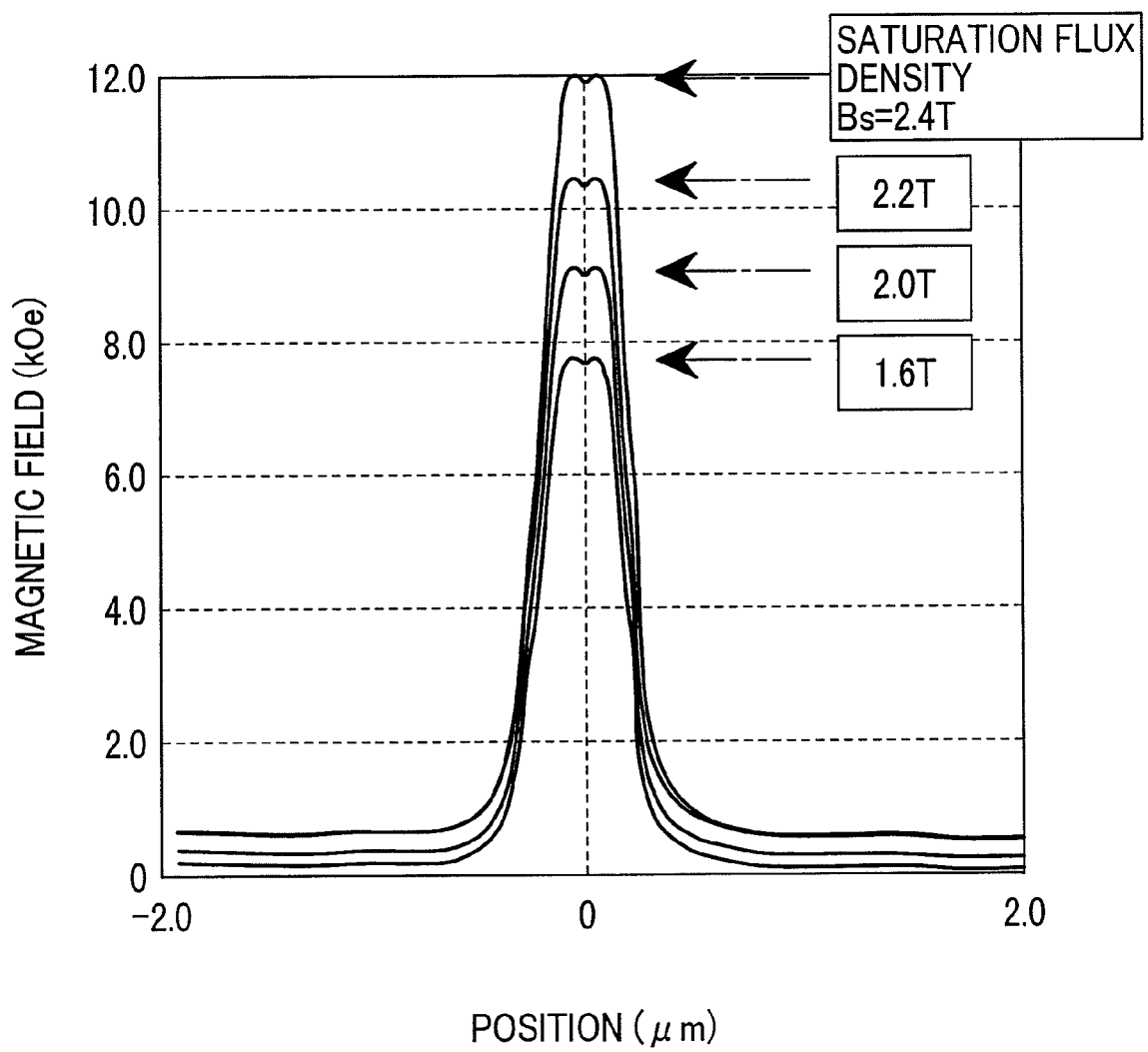
FIG. 2 is a graph showing the dependence of the thin film magnetic head magnetic recording field distribution on the main magnetic pole material Bs.
Figure 3:
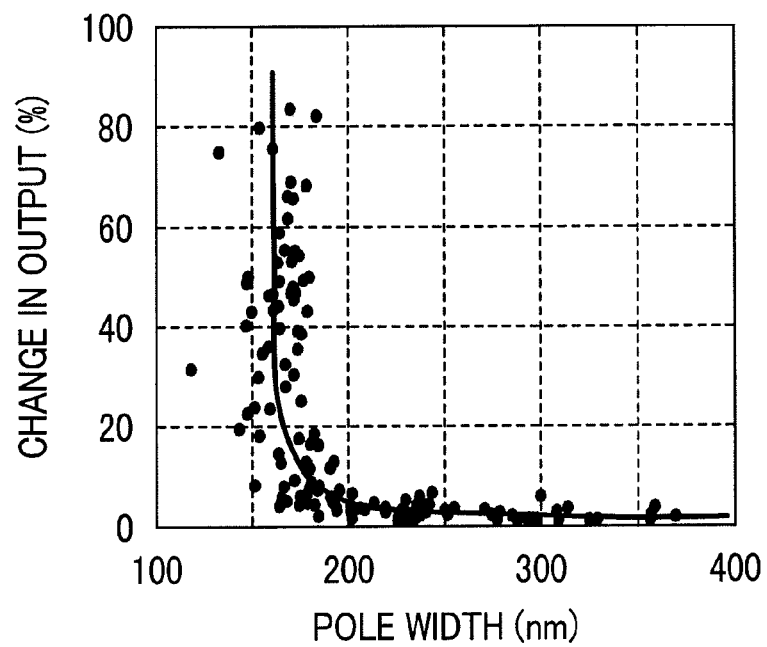
FIG. 3 is a graph showing the rate of change in output versus the write pole width.
Figure 4:
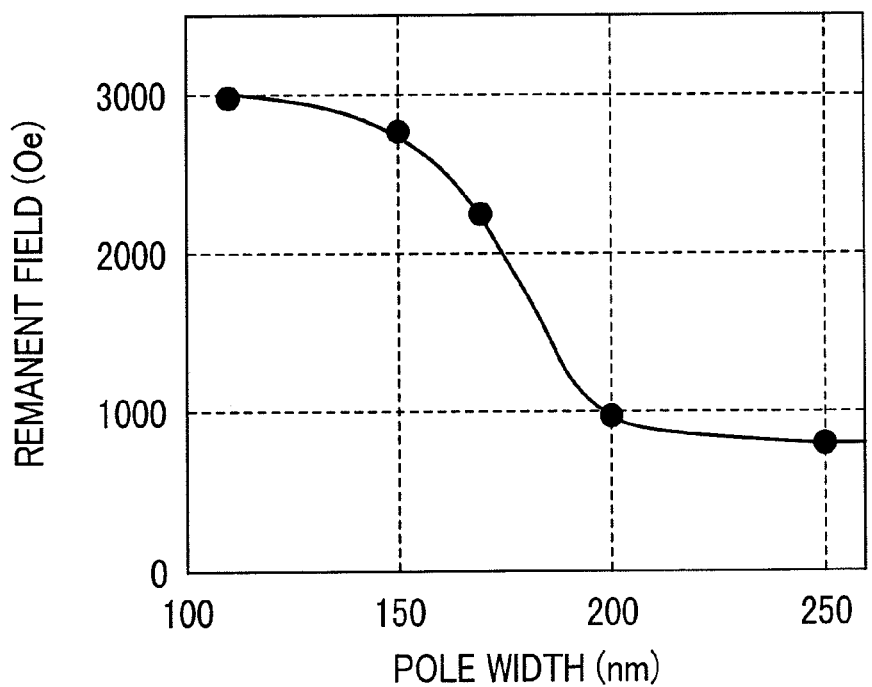
FIG. 4 shows the relation of remanent magnetization to magnetic pole width.
Figure 5A:
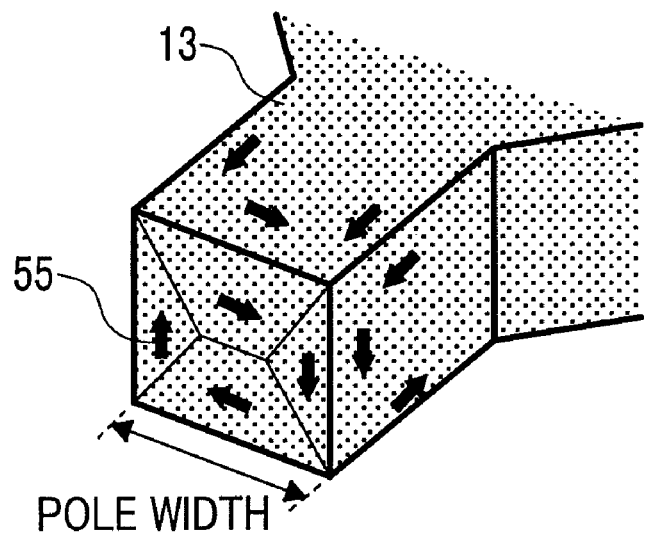
FIG. 5A is a diagram showing the magnetic state of the magnetic pole tip when the pole width is 300 nanometers.
Figure 5B:
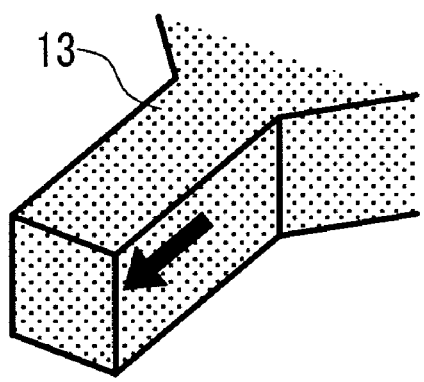
FIG. 5B is a diagram showing the magnetic state of the magnetic pole tip when the pole width is 100 nanometers.

The thin film perpendicular magnetic recording head of the present invention is composed of a main pole, a return path for supplying a magnetic flux to said pole, and a conductive coil for excitation of the main pole and the return path. The main pole is also characterized in having a width of 200 nanometers or less; possessing a magnetic multilayer made up of a high saturation flux density layer (high Bs layer) and a low saturation flux density layer (low Bs layer); and the high saturation flux density layer contains an iron-cobalt alloy.

The low saturation flux density layer also has a thickness within a range of 0.5 nanometers or more to 5 nanometers or less. In the magnetic multilayer, the direction of magnetism is in an antiparallel array in the pair of high saturation flux density layers facing each other by way of the low saturation flux density layer.

The high Bs layer is preferably made up of four or more layers and a structure with high Bs layers of different thickness is more effective. A full effect can be obtained if the number of high Bs layers is ten layers or more.

Adding an additive elements of 10 percent or less in the high Bs layer, allows using a ferromagnetic material having improved soft magnetic properties. If this high Bs layer at this time has a body-centered cubic structure, both a high Bs of 2.2 T or more and even more satisfactory soft magnetic properties can be obtained.

In the magnetic multilayer made from a high Bs layer and low Bs layer, the layers are arrayed in parallel in a direction perpendicular to the medium surface facing the main pole.

In terms of obtaining soft magnetic properties, the non-magnetic layer and low Bs layer are preferably below 2.2 T, and have a face centered cubic structure as the crystalline structure.

A material of Ni—Cr, Ni—Fe, Ni—Fe—Cr, Ta, will prove satisfactory.

Since the main magnetic pole must generate a high magnetic recording field capable of sufficiently magnetizing a magnetic recording medium of high magnetic coercivity, a preferred magnetic multilayer layer thickness is a low Bs layer or non-magnetic layer of 5 nanometers or less, or a high Bs layer of 50 nanometers or less, or is a combination of both layers. A more complete effect can be obtained if the high Bs layer is 20 nanometers or less.

An ideal means for forming a main pole comprised of a magnetic multilayer is a method combining a deposition process using sputtering and an etching process using ion milling.

The write element return path can achieve stable recording operation with optimal efficiency by utilizing a single Bs layer comprised of small material less than 2.2 T, or a multilayer of soft magnetic material.

By utilizing the above structures singly or in multiple combinations, a high reliability perpendicular thin film magnetic recording head generating virtually no remanent magnetization can be supplied at a low cost.

Further, by combining this type of thin film magnetic head with a magnetic recording medium comprising a flux keeper layer, a high-capacity, yet low cost magnetic disk drive can be achieved. In this case, the effect is rendered that a multilayer structure with flux keeper layer and a write element main pole with suppressed remanent magnetization are obtained so that the drive reliability is further enhanced.

Many attempts to further improve recording density have been attempted in recent years by purposely applying longitudinal components to the magnetic recording field and magnetic anisotropy of the medium recording layer have been made. However, since perpendicular components are dominant in comparison with longitudinal components in the magnetic recording field, this kind of method is also usually grouped under the perpendicular recording. Also, methods to add longitudinal magnetic components to the recording field by contriving means such as auxiliary poles or write elements whose structure includes an improved recording field gradient are being evaluated. However these methods are no different from the basic function of magnetizing the medium using the magnetic field output from the medium surface that faces the main pole so that these methods may also be referred to as perpendicular thin film magnetic recording heads. The present method is also applicable and effective on these magnetic recording systems or write elements.

The perpendicular thin film magnetic recording head and magnetic disk drive of the present invention is hereafter described in detail while referring to the accompanying drawings.

The magnetic multilayer (magnetic multilayer film) comprising the main pole of the present invention is formed by radio-frequency magnetron sputtering device as described next. The material for forming the magnetic pole is sequentially deposited on the base formed beforehand for forming the ceramic substrate in an argon gas chamber at a pressure of one to six milli-Torr. Here, Fe—Co, Ni—Cr, Ni—Fe—Cr, Ta, Al, Al—O, Si, Si—O were utilized as the sputtering target. Radio frequency power is applied to cathodes positioned on the targets to generate a plasma within the apparatus. Layers are then formed in sequence by opening and closing one at a time, a shutter positioned at each cathode, and the multilayer formed.

During forming of the layer, a permanent magnet is utilized to apply a magnetic field parallel to the surface of the substrate, for applying uniaxial magnetic anisotropy. Patterning for forming elements on the substrate is performed by a series of processes including exposing and developing the photoresist. And the process also includes ion-milling. Finally, the substrate is machined in a slider and by combining with a stainless suspension is mounted in the magnetic disk drive.

First Embodiment

Figure 6:
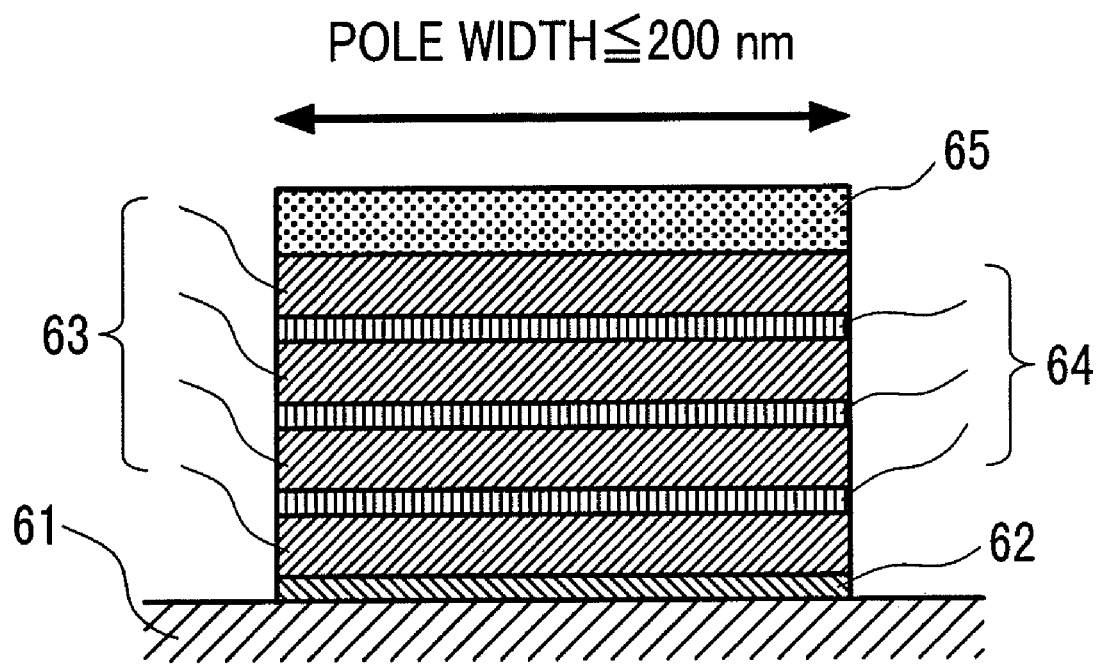
FIG. 6 is a drawing showing the layers of the pole tip section of the thin film magnetic recording head of the first embodiment of the present invention.

FIG. 6 is a cross sectional view showing the structure of the magnetic multilayer of the first embodiment of the present invention. A high Bs layer 63 and a nonmagnetic layer 64 are alternately deposited on the substrate 61 by way of the underlayer 62, and finally covered by a protective layer 65. This high Bs layer 63 is $Fe_{70}Co_{30}$ having a body-centered cubic structure. The underlayer 62 and nonmagnetic layer 64 are both $Ni_{80}Cr_{20}$ (film thickness 3 nanometers) having a face-centered cubic structure. FIG. 6 shows the magnetic multilayer as seen from the medium surface facing the main pole.

Figure 7:
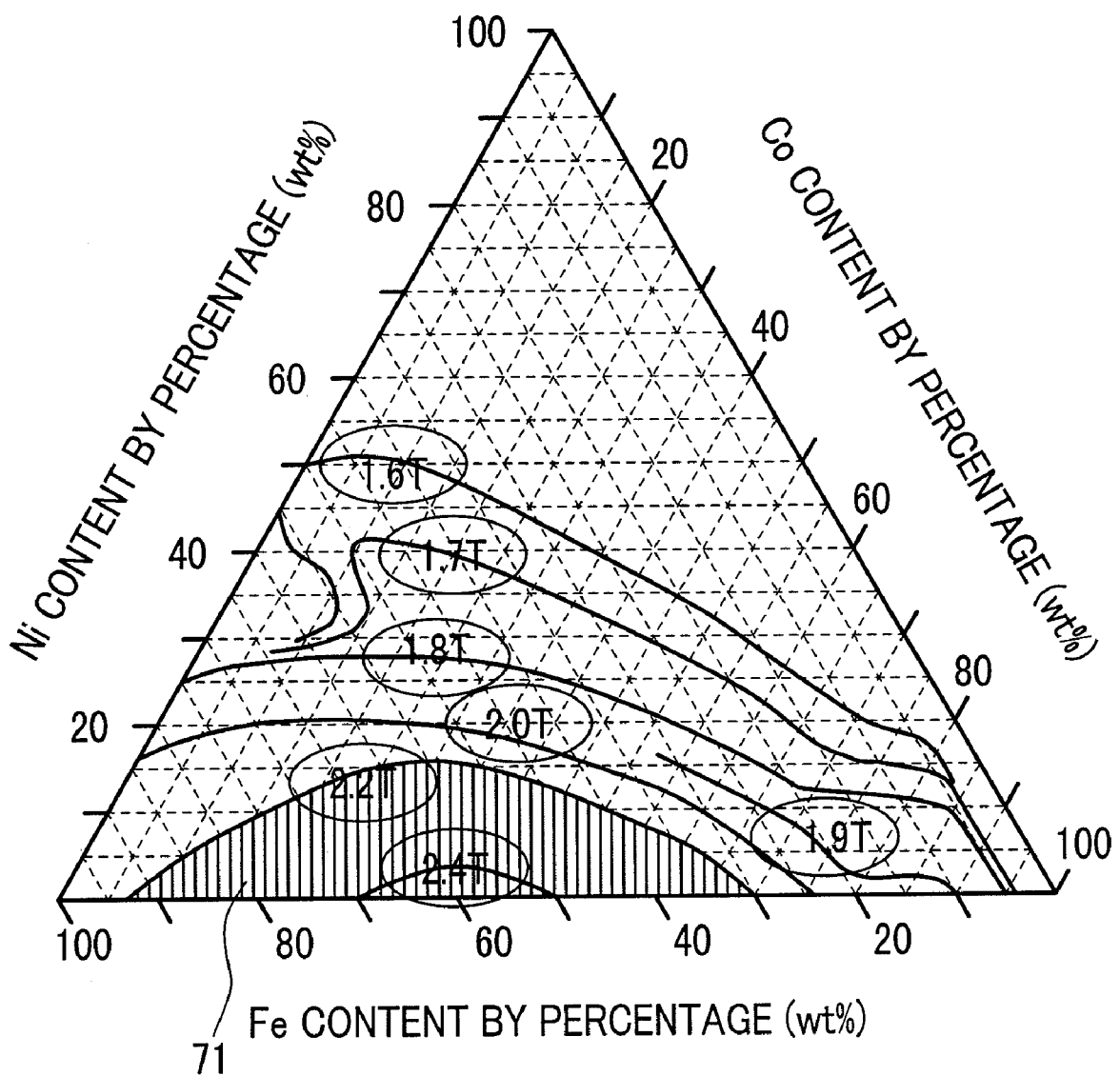
FIG. 7 is a phase diagram of the Bs of the 3-element alloy of cobalt, nickel and iron.

The thickness of each high Bs 63 layer is calculated for a total high Bs layer thickness of 200 nanometers so each layer in the example in FIG. 6 is 25 nanometers. The low Bs layer is nickel-chromium alloy and is 3 nanometers thick. Measuring the magnetization curves showed that the magnetic coercivity along the easy axis and the hard axis were both below 4 Oe, the anisotropic magnetic field Hk was 10 Oe or less, the magnetostriction coefficient was a large, positive value of $+5 \times 10^{-6}$. The high Bs layer 63 had a Bs value of 2.4 T, matching the Bs predicted from phase diagram of the Fe—Co—Ni 3 element alloy as shown in FIG. 7.

In all of the following embodiments including the present embodiment, the Bs of the high Bs layer is 2.2 T or more. Therefore, in the case of the Fe—Co—Ni alloy, the composition utilized for section 71 enclosed by the boundary 2.2 T in the phase diagram of FIG. 7 may be used. In the case of the composition expressed by $(Fe_\alpha Co_\beta)_{100-\gamma}M_\gamma$ (where, M is B, Ti, Nb, Al, Al—O, Si, Si—O; and $0 \leq r \leq 15$), the Bs for a 3-element alloy also containing an additive M is 2.2 T or more so that the preferable composition corresponds to the section where $(Fe_\alpha Co_\beta)$ is surrounded by the boundary for 2.4 T in FIG. 7.

The example in FIG. 6 showed the high Bs layer having four layers however the inventors here manufactured the head varying it from 1 to 25 layers.

Figure 8:
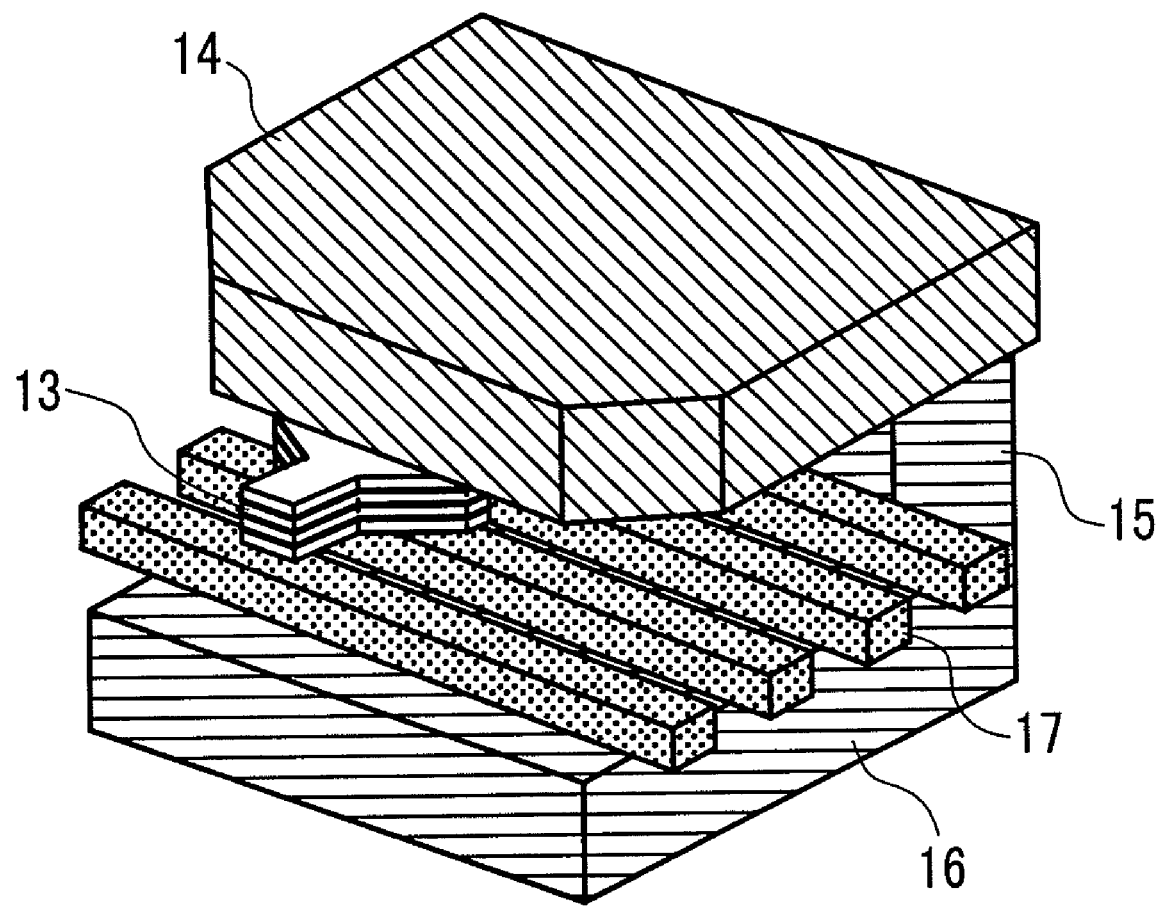
FIG. 8 is a perspective view showing the overall structure of the write element of the first embodiment of the present invention.

The thin film magnetic head shown in FIG. 8 is formed from these magnetic multilayers by undergoing wafer processes and slider machining processes including a: (1) resist coating-baking process, (2) light exposure process, (3) developing process and (4) ion milling process. Here, the pole width was made 150 nanometers in the surface of the pole 13 facing the medium, however absolutely identical results can be obtained with a pole width of 200 nanometers or less. The ferromagnetic material for the yoke 14, the return path 15, and the auxiliary pole 16 was in all cases nickel-iron (Ni—Fe) alloy, however the Bs was 1 T or less since nickel made up more than 80 percent of the component. The magnetostriction coefficient appeared as a negative value. By utilizing a negative magnetorestriction material in this way, the aforementioned inverse magnetorestriction effect ensures that the magnetism of the yoke 14, the return path 15, and the auxiliary pole 16 will tend to be stable in a direction parallel to the surface of the medium. This material allows avoiding problems such as remanent magnetic fields and unstable characteristics in magnetization of sections other than the pole tip.

The read element is omitted here, however it is included in all of the following embodiments and can be applied to read elements of all types of principles and structures including Current-in-Plane-Giant Magnetoresistive (CIP-GMR) elements, Current-Perpendicular-Giant Magnetoresistive (CIP-GMR) elements, Tunnel Magneto-resistive (TMR or MJT) or Magneto Tunnel Junction (MTJ) elements, etc.

Figure 9A:
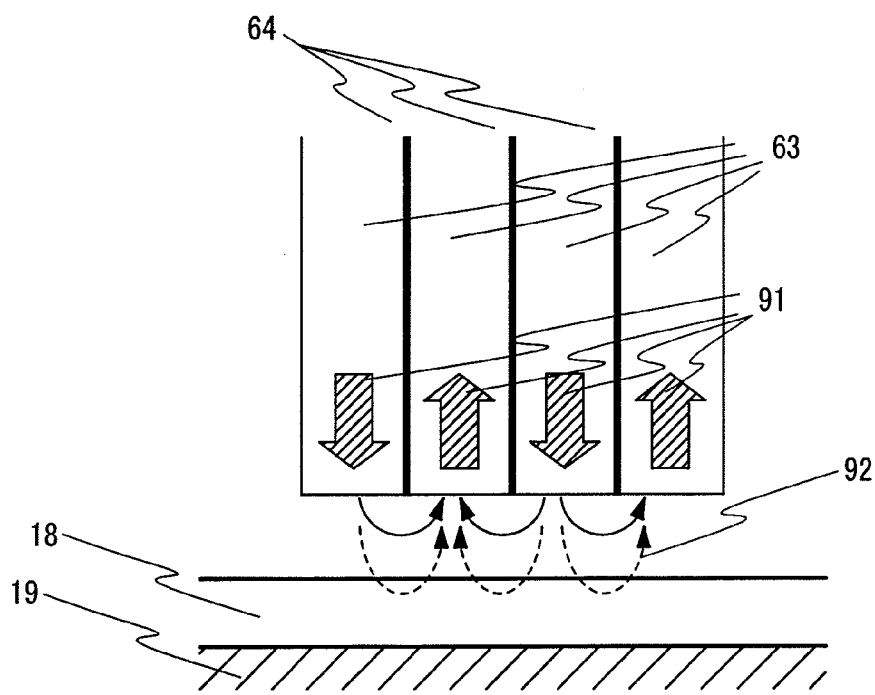
FIG. 9A is a drawing showing the relation of the layer structure of the pole tip and the remanent magnetic field.

FIG. 9A is a drawing showing results from calculations for finding the ideal layer structure prior to fabricating the head. As described previously, the magnetostriction coefficient is a positive value in high Bs material exceeding 2.2 T so that magnetization tends to easily face the medium surface due to the inverse magnetorestriction effect. Therefore in designing the layer structure, the remanent field 92 must be made sufficiently low even if the magnetization 91 of each high Bs layer 63 is facing the medium surface.

Figure 9B:
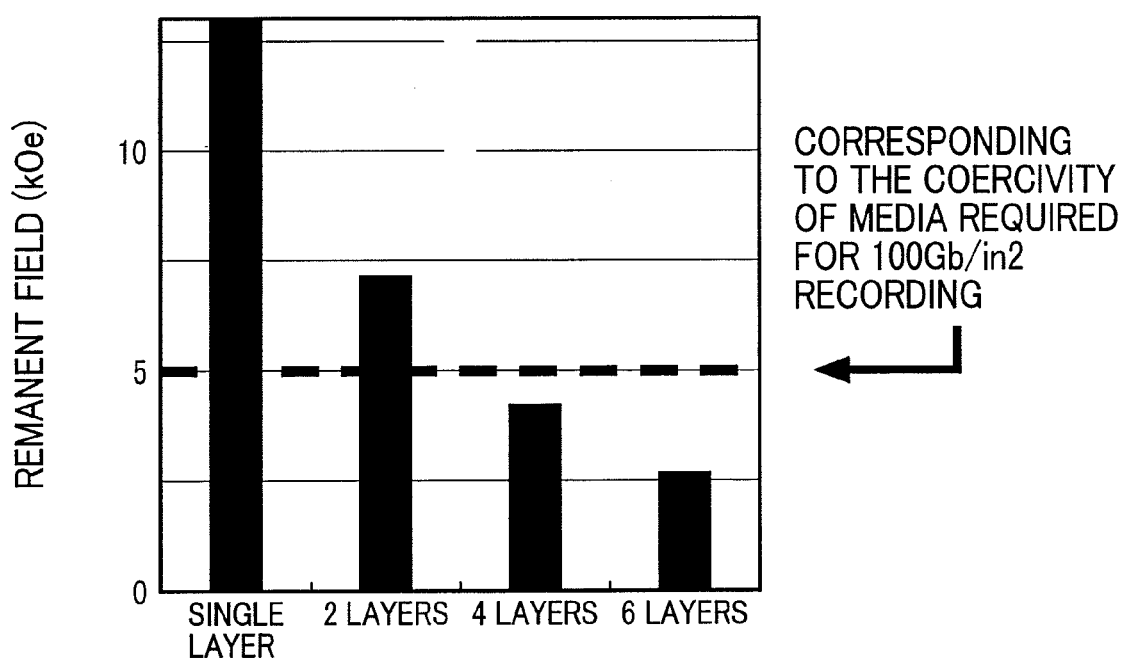
FIG. 9B is a graph showing the relation of the layer structure of the pole tip and the remanent magnetic field.

The advantage when using a multilayer is that the magnetization 91 of each high Bs layer is in an anti-parallel configuration as shown in FIG. 9A. The remanent field 92 is therefore not applied to the medium because of the return flow on the magnetic pole itself. FIG. 9B shows the calculated results of the dependence of remanent magnetization on the number of high Bs layers assuming this anti-parallel configuration. As shown in the figure, at least four or more layers are required in view of the need to this remanent field smaller than the magnetic coercivity of the medium.

Figure 10A:
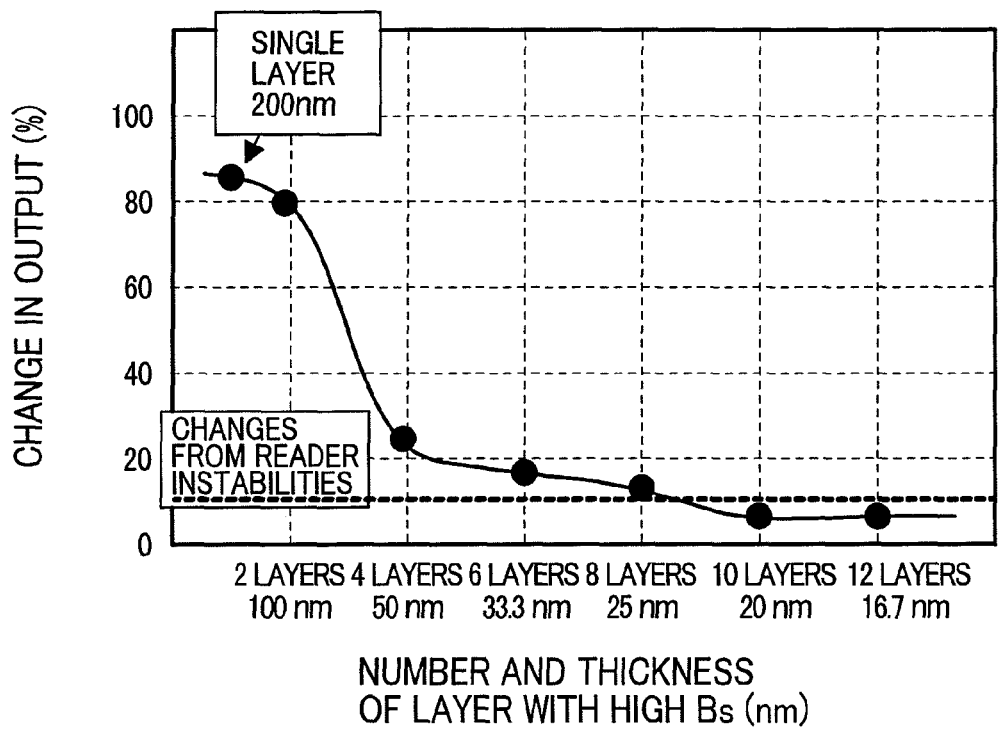
FIG. 10A is a graph showing the relation of the layer structure of the pole tip and the change in output.
Figure 10B:
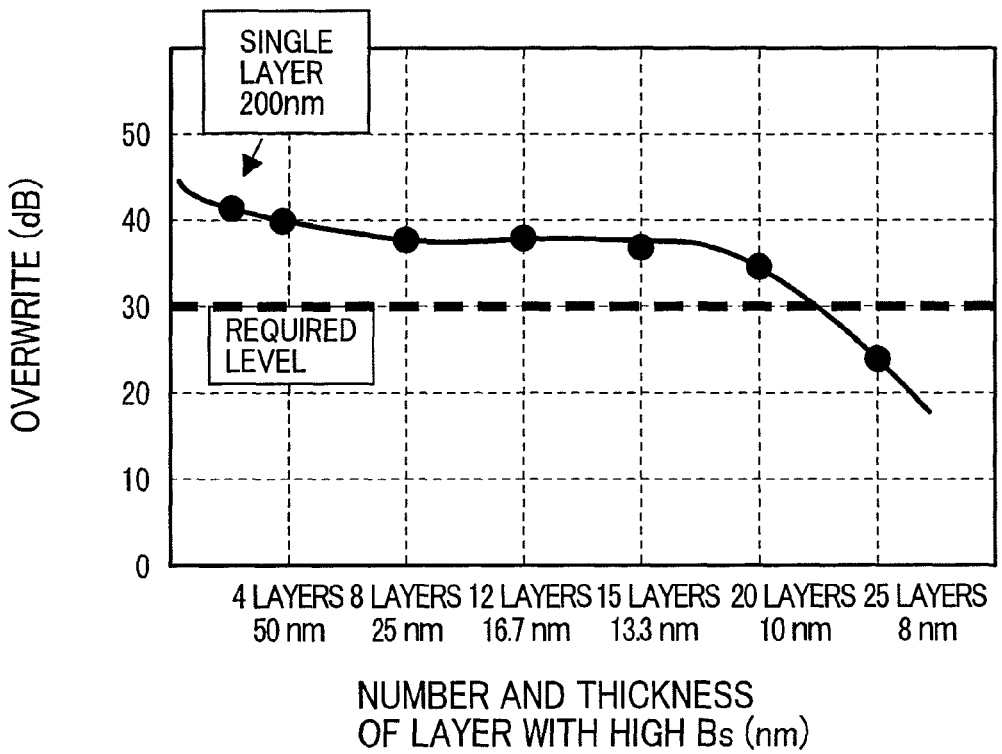
FIG. 10B is a graph showing the relation of the layer structure of the pole tip and the change in output rate and the overwrite.
Figure 11A:
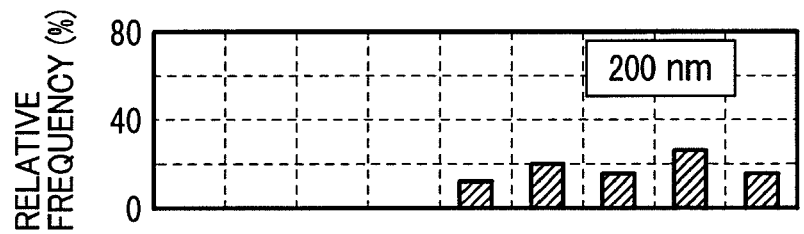
FIGS. 11A-11D are graphs showing the relative frequency distribution of the change in output for groups of thin-film magnetic heads with different pole tip layer structures.
Figure 11B:
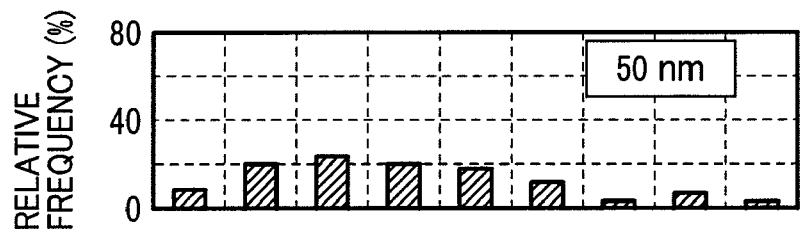
Figure 11C:
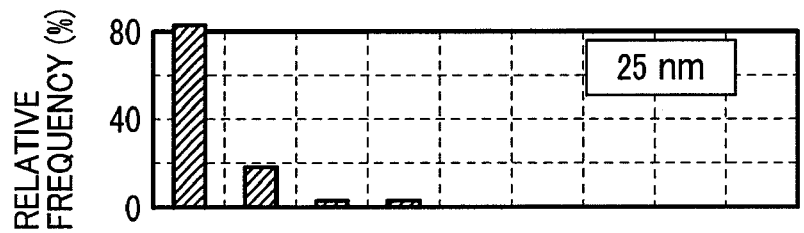
Figure 11D:
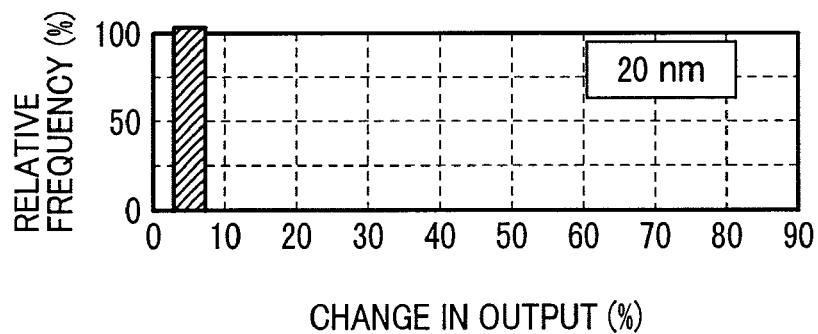

FIG. 10 shows results from evaluating characteristics of the perpendicular recording head manufactured in this way. FIG. 10A is a graph showing the dependence of the change in output upon the layer structure. FIG. 10B is a graph showing the dependence of the overwrite on the layer structure. These figures clearly show that the change in output is greatly improved by using four layers or more. Further, at ten layers or more, the change in output rate becomes fixed at 10 percent or less. As related before, the sensitivity of the read element itself fluctuates at output changes of 10 percent or less so erasure-after-write can be completely suppressed at 10 layers or more.

FIG. 11 showed the relative frequency distribution of the change in output for groups of thin-film magnetic heads. All the heads can definitely be confirmed as having a change in output of 10 percent or less when using 10 layers. A look at FIG. 10B on the other hand, shows that the overwrite erasure has started to deteriorate at 20 layers or more and at 25 layers has fallen below 30 dB which is generally considered a required level. This deterioration is due to the large increase in volume taken up by nonmagnetic layers when too many layers have been added, and may lead to a drop in the magnetic recording field.

Results from the embodiment showed that four or more layers are require for high Bs material and that a full effect can be obtained at 10 layers or more. This is equivalent to a thickness of 50 nanometers or less for high Bs layers and preferably within 20 nanometers or less. On the other hand, 20 layers or less or at a film thickness of 10 nanometers or less is required for recording (write) performance.

The nonmagnetic layer 64 and the underlayer 62 that serve to divide the high Bs layers should be at least within 2.2 T and smaller than the Bs of the high Bs layer and preferably should be a material of 2.0 T with small crystalline magnetic anisotropy. Here, nickel-chromium (Ni—Cr) alloy is generally utilized for non-magnetic characteristics at room temperature, however if the crystalline structure is a face centered cubic structure then the same results can be obtained even when low Bs materials with magnetic elements such as nickel-iron, or non-magnetic materials such as Ni—Fe—Cr are included. The same satisfactory effects can be obtained when selected from the above group of materials, whether the underlayer 62 and intermediate layer 64 are made from the same materials or made from different materials.

Figure 12:
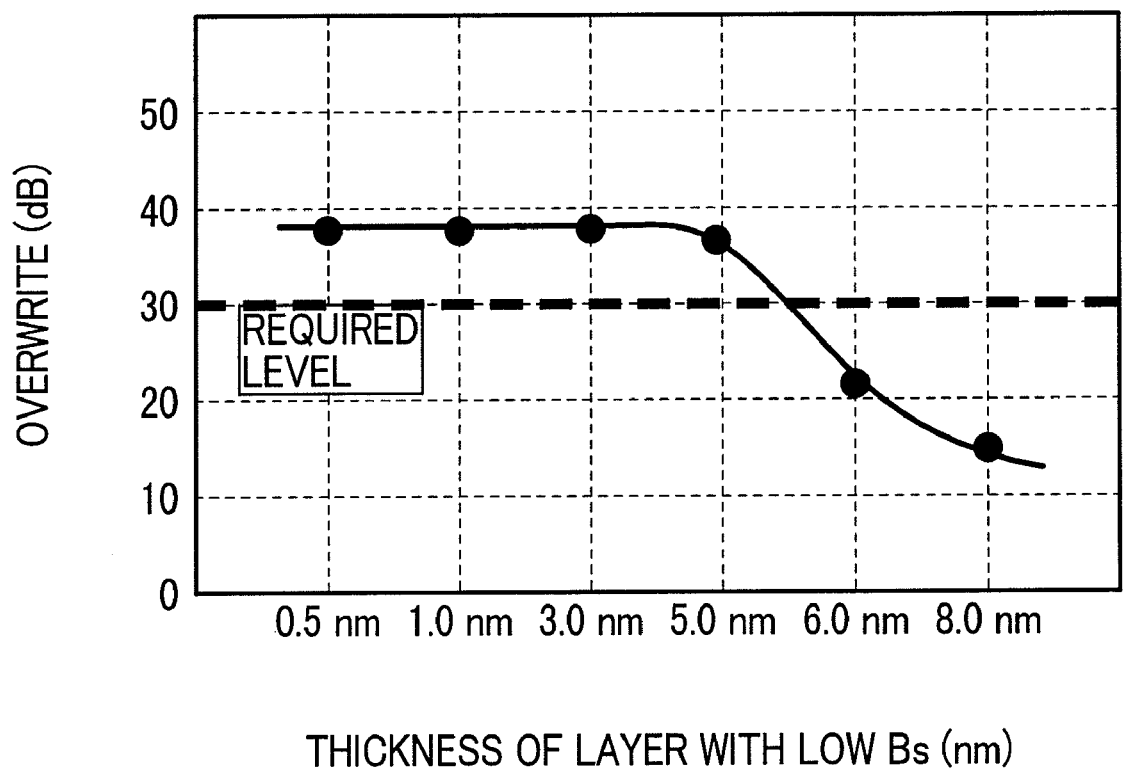
FIG. 12 is a characteristics chart showing the relation of the thickness of the low saturation flux density layer and the overwrite.

Evaluations were made of different types of structures for low Bs layer thickness. It was found that an 0.5 nanometer thickness is necessary to prevent ferromagnetic coupling (generally called the orange peel effect) between high Bs layers. In regards to the upper limit, FIG. 12 shows results of actual measurements of overwrite when the low Bs 64 layer thickness was changed in a range from 0.5 nanometers to 10 nanometers. These results reveal that the recording (write) characteristics deteriorate greatly when the thickness of low Bs layer 64 exceeds 5 nanometers. This deterioration occurs because the percentage of volume taken up by the low Bs layer has increased creating the same effect essentially as if the overall Bs level had dropped, and so the magnetic recording field weakens.

Figure 13:
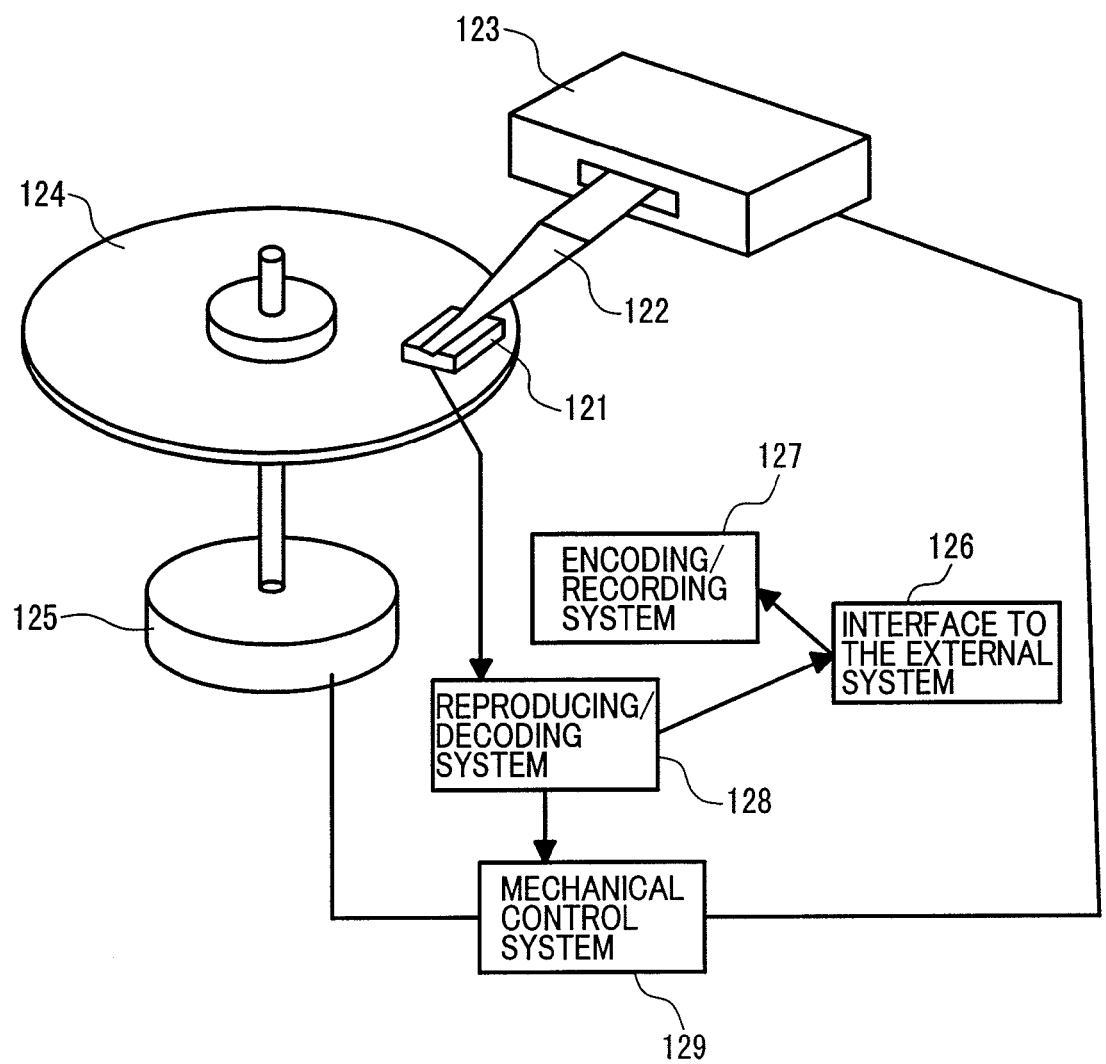
FIG. 13 is concept diagram of the magnetic disk device of the present invention.

FIG. 13 is a concept view of magnetic disk drive comprising the head manufactured in the first embodiment and the magnetic recording medium having the flux keeper layer. The slider 121 holding the thin film magnetic head is supported by the suspension arm 122. Information is read at the desired location positioned on the disk 124 by the positioner device 123, and rotation of the disk 124 is controlled by the spindle motor 125. A signal (servo signal) showing the position is recorded on the disk 124 beforehand. After processing the servo signal read by the head on the mechanism control circuit 129, closed loop control is implemented by feedback to the positioner device 123.

User data entering by way of the external interface 126 is encoded, processed and converted into a recording current waveform by a satisfactory method for the magnetic recording system in the data encoding/recording system 127, and the bits are written on the medium by excitation of the write element. Conversely, stray magnetic fields from written bits are converted into electronic signal by sensing them with a read element and after being waveform-shaped and decoded in the data reproducing/decoding system 128 by a satisfactory method for the magnetic recording system are recreated as user data. Therefore, as a result of using the thin magnetic head of the present invention in a magnetic disk drive operating in this way, stable operation can be achieved without causing problems such as erase-after-write. A high-capacity and highly reliable, yet low cost magnetic disk drive can in this way be achieved.

With the distance between the layer center thickness set as D, and the gap between the main pole tip and the flux keeper layer of medium during device operation as H, if the flux between the high Bs layers of the main pole in a remanent state is set as $D \leq 2 \times H$ to allow an effective return flow, then it is known that the long term reliability in particular will be excellent.

In the magnetic recording medium with flux keeper layer used up until now, the flux keeper layer structure was made from a single ferromagnetic layer. However, a magnetic disk drive combining a magnetic recording media with a flux keeper layer made from a multilayer structure, and thin film magnetic head of the present invention will prove effective in achieving a magnetic disk drive with more stable operation and high reliability.

Figure 14A:
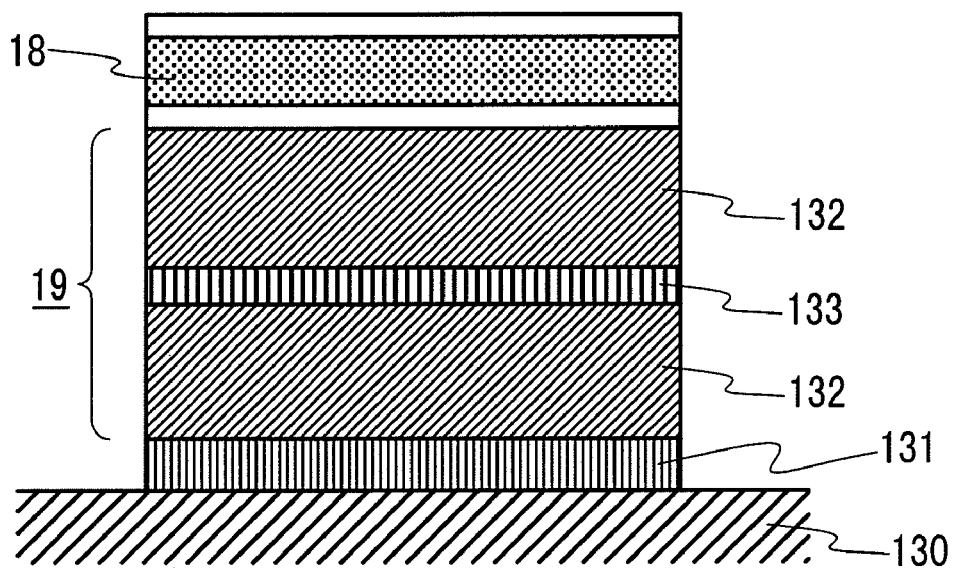
FIG. 14A is a cross sectional view of the magnetic recording medium containing an improved flux keeper layer utilized in the first embodiment of the present invention.
Figure 14B:
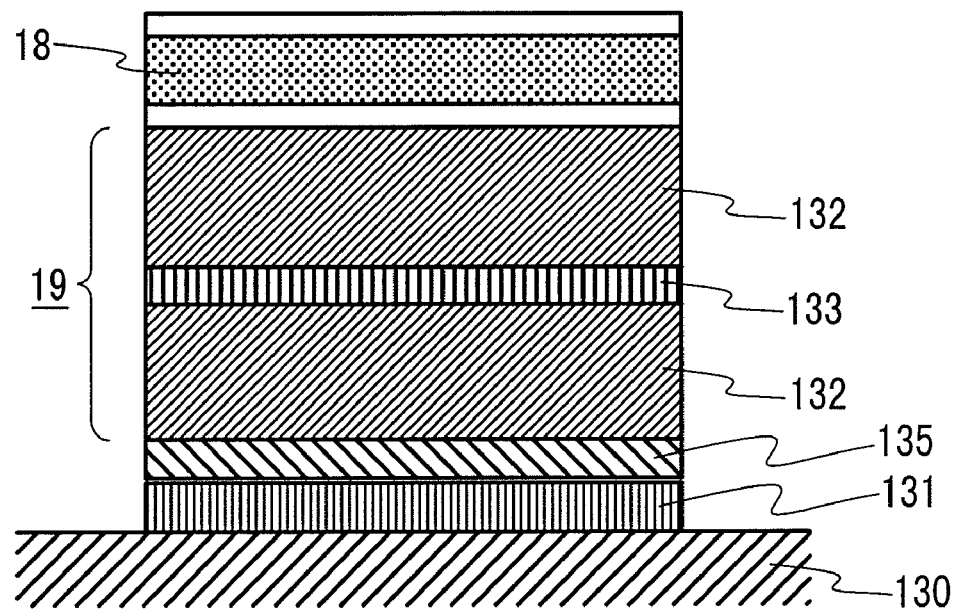
FIG. 14B is a cross sectional view of the magnetic recording medium containing an improved flux keeper layer utilized in the first embodiment of the present invention.

FIG. 14A and FIG. 14B are cross sectional views of the structure of the improved flux keeper layer. FIG. 14A is a magnetic recording medium comprised of a ferromagnetic layer 132 divided by a non-magnetic material layer 133 in the flux keeper layer 19 formed on a substrate 130. By combining the magnetic recording medium configured as described, with the thin film magnetic head of this embodiment, a main pole comprised of merely six high Bs layers can completely suppress erasure-after-write. It was also clear that the magnetic disk mounted with this head can deliver stable operation. Further, by selecting an alloy material containing mainly any of Ru, Cr, Ir, Rh as the nonmagnetic layer 133, an antiferromagnetic exchange can occur between the ferromagnetic layers 132, and the stability of the magnetic state within the flux keeper layer can be improved so that erasure-after-write can be completely suppressed even when there are only a few (6) high Bs layers in the main pole.

Next, FIG. 14B is a layer structure equivalent to that of FIG. 14A, but inserted with an antiferromagnetic layer 135. A satisfactory effect was obtained when IrMn, FeMn, PtMn, CrMnPt, NiO were selected as the antiferromagnetic layer. Both FIG. 14A and FIG. 14B employed a double layer structure for the ferromagnetic layers 132, however the same satisfactory effect was obtained even when three to five ferromagnetic layers 132 were used. The beneficial effect in the multilayer keeper layer was drastically increased when the thickness of the ferromagnetic layers 132 were 100 nanometers or less.

Accordingly, by combining a magnetic recording medium having an improved flux keeper layer, with a thin film magnetic head of the present invention, a magnetic disk drive of excellent reliability can be achieved.

Second Embodiment

In the first embodiment, the layers were formed to the same thickness within a certain range (generally about ±5%) for variations during forming of the high Bs layer for the main pole. However, by purposely forming a structure of different thickness, even further improvements can be achieved.

Figure 15:
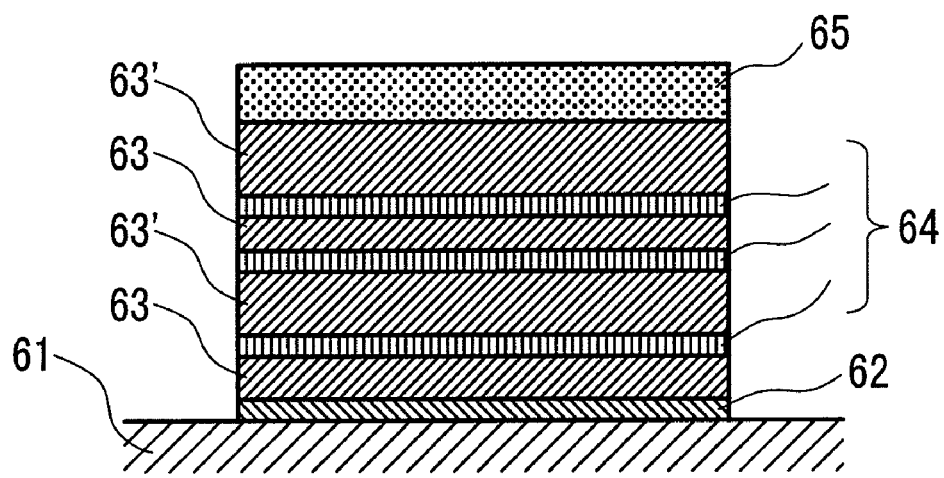
FIG. 15 is a cross sectional view of the pole tip of the second embodiment of the present invention.

FIG. 15 is a cross sectional view showing the structure of this type of embodiment. Here, a film thickness difference of 20 percent was made between a first high Bs layer (odd numbered high Bs layer from the substrate side) 63 and a second high Bs layer (even numbered high Bs layers from the substrate side) 63' and these layers then alternately formed in a laminated structure. By utilizing this structure, an identical magnetic state can be constantly achieved for each magnetostatic exchange by high Bs layers in a remanent magnet state. Consequently, the same characteristics appear for $10^{10}$ cycles of write operations which is an extremely large number, showing that the stable operation of the magnetic disk device has been improved.

Third Embodiment

Figure 16:
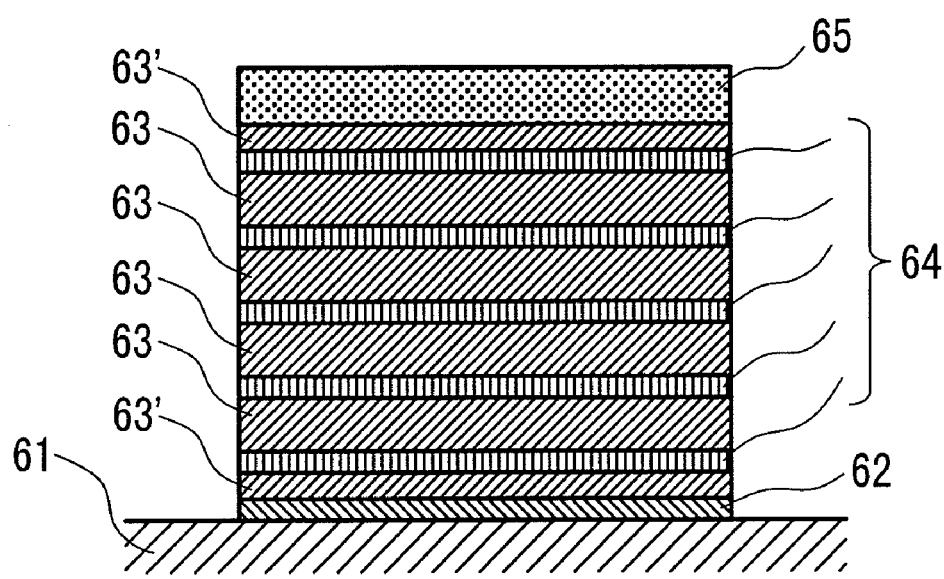
FIG. 16 is a cross sectional view of the pole tip of the third embodiment of the present invention.

An example of the second embodiment with high Bs layers of the main pole having different structures for each layer is shown in FIG. 16. This embodiment has a structure where among the high Bs layers, the high Bs layer nearest the substrate and the high Bs layer farthest from the substrate are made thinner than the other high Bs layers. In this structure, since these two layers have only a high Bs layer on one side, the weak remanent magnetic fields are not applied to the media. It was also found that satisfactory read/write characteristics can be obtained with no loss in long term stability of bits written on the magnetic record medium.

The structure of the write element used in all of the embodiments up to now is shown in FIG. 8. The following embodiments of the present invention are for a thin film magnetic head other than the structure shown in FIG. 8.

Fourth Embodiment

Figure 17:
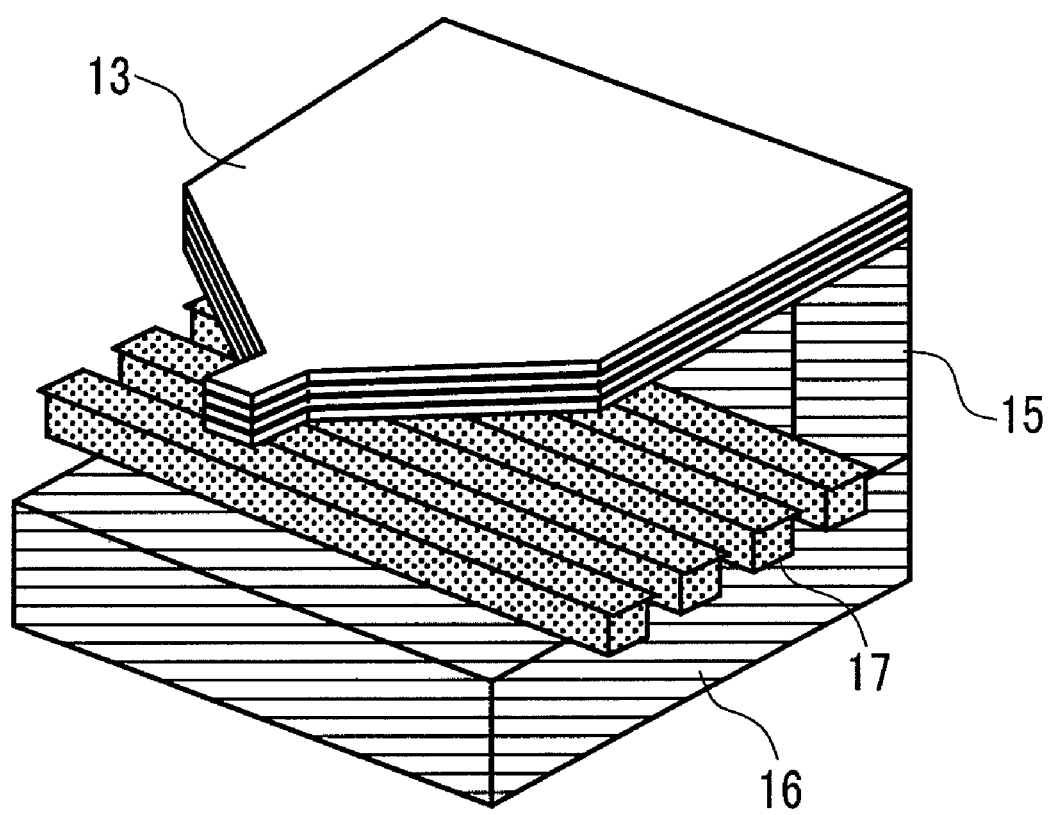
FIG. 17 is a perspective view of the write element of the fourth embodiment of the present invention.

FIG. 17 is a perspective view of the write element in which the main pole tip 13 is connected directly to the return path 15 but with the yoke 14 of FIG. 8 omitted. All the layer structure combinations of the above first through third embodiments were tried and absolutely the same results were obtained. The process for forming the write element was greatly shortened in this embodiment so a thin film magnetic head with high reliability, high performance can be achieved at a lower cost.

Fifth Embodiment

Figure 18:
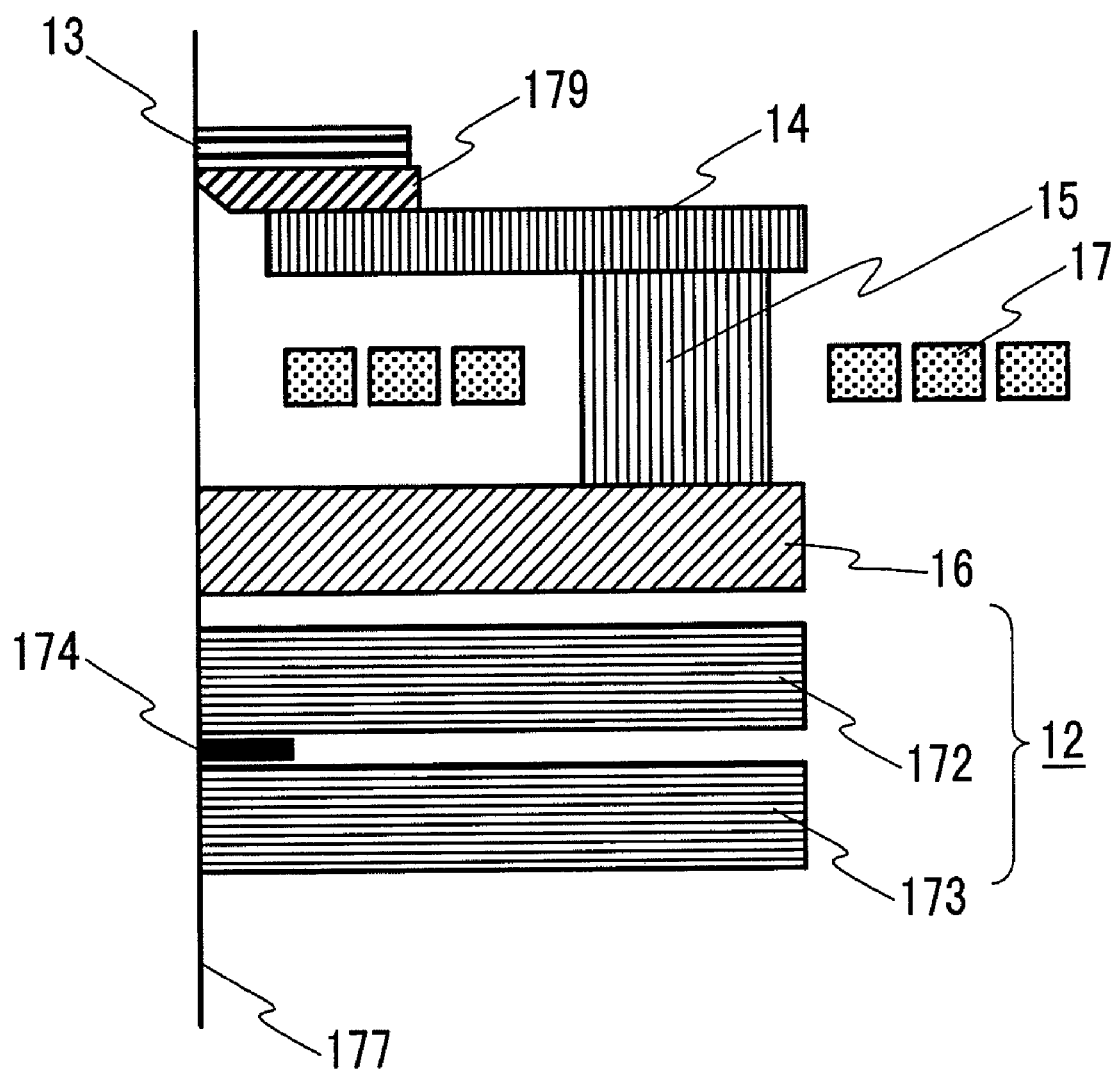
FIG. 18 is a cross sectional view of the thin film recording head of the fifth embodiment of the present invention.

FIG. 18 is a cross sectional view of the thin film magnetic head of the present invention. In this structure, the main pole taper section 179 is contacting the main pole tip 13 and layer surface. As it nears the surface 177 facing the medium, the main pole taper section 179 becomes narrower in size in the direction of layer thickness, forming into a wedge shape. A material for the ferromagnetic alloy comprised mainly of Co—Ni—Fe or Fe—Ni is utilized having a Bs higher than the yoke 14 and lower than the main pole tip 13.

A structure of this type may provide an approximately 30 percent increase in the magnetic recording field. Though the magnetic coercivity of the recording layer exceeded 6 kOe in the magnetic recording medium, and a high overwrite of more than 35 dB was obtained. The areal recording density was therefore improved approximately 30 percent even with the same magnetic pole width.

The yoke 14 is in contact with the substrate side surface of this main pole taper section 179. However, by forming the main pole tip and the main pole taper section 179 more to the substrate side from the yoke 14, it was clearly found that absolutely the same effects are obtained even in a structure where the yoke 14 and main pole tip 13 are in direct contact.

Sixth Embodiment

Figure 19:
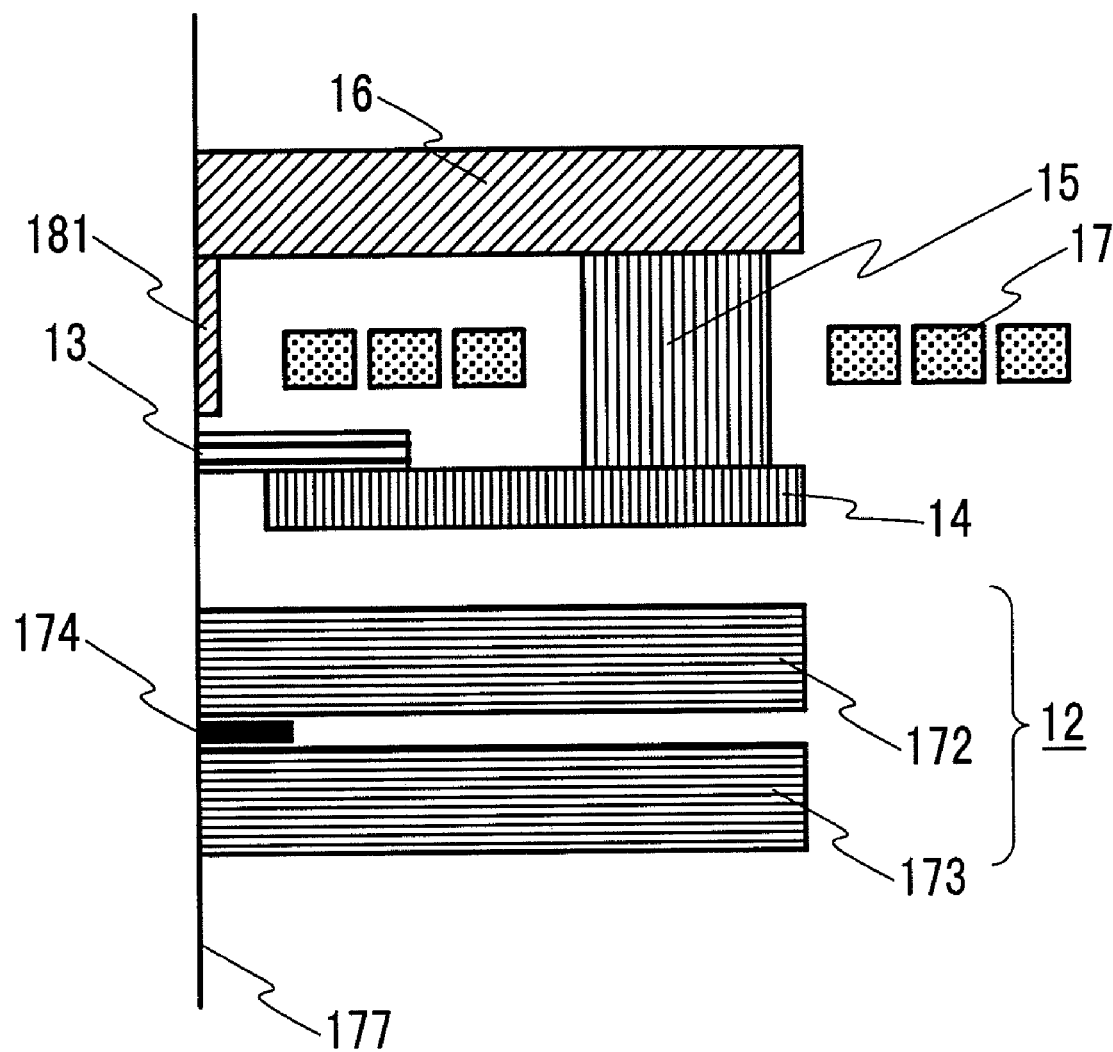
FIG. 19 is a cross sectional view of the thin film recording head of the sixth embodiment of the present invention.

FIG. 19 is a cross sectional view of the thin film magnetic head of the present invention. The main pole tip 13 is positioned more to the substrate side than the auxiliary pole 16. The auxiliary pole tip 181 extends from the auxiliary pole 16 towards the main pole tip 13 on the substrate side 177. This auxiliary pole tip 181 will cause a steeper gradient on the trailing side (side opposite the substrate) of the magnetic field generated from the main pole tip 13. Utilizing this structure improved the signal resolution by 15 percent. The signal resolution is thought to be dependent on this magnetic recording field gradient. A stable and highly reliable, thin film magnetic head with even higher record (write) density can therefore be provided.

Incidentally, even supposing use of a structure of FIG. 19 with the auxiliary pole tip 181 removed, the effect of the invention is in now way diminished in terms of at least the stability and reliability.

Seventh Embodiment

Figure 20A:
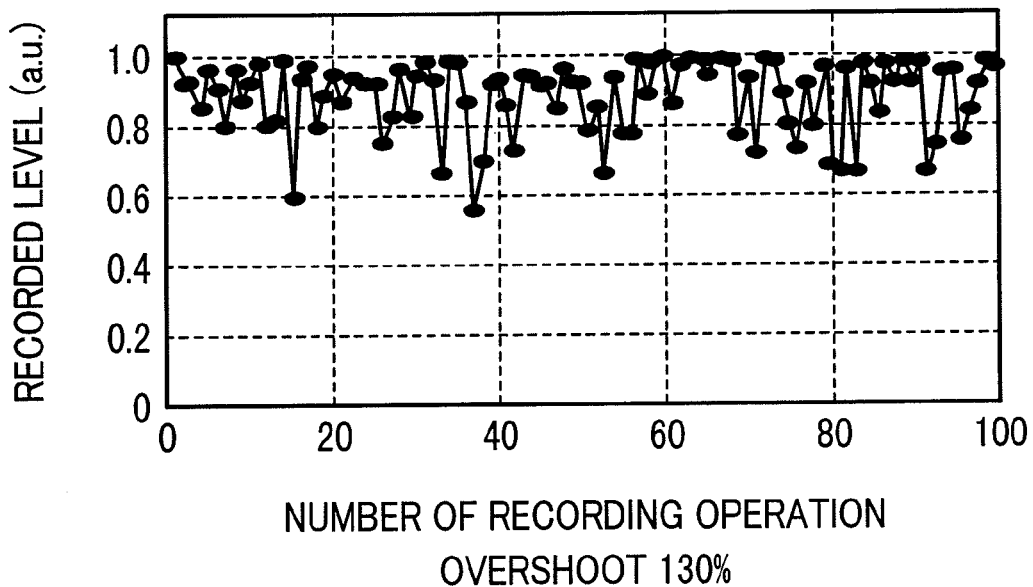
FIG. 20A is a data characteristics graph rating the stability of record (write) operation (when overshoot is 130%) of the seventh embodiment.
Figure 20B:
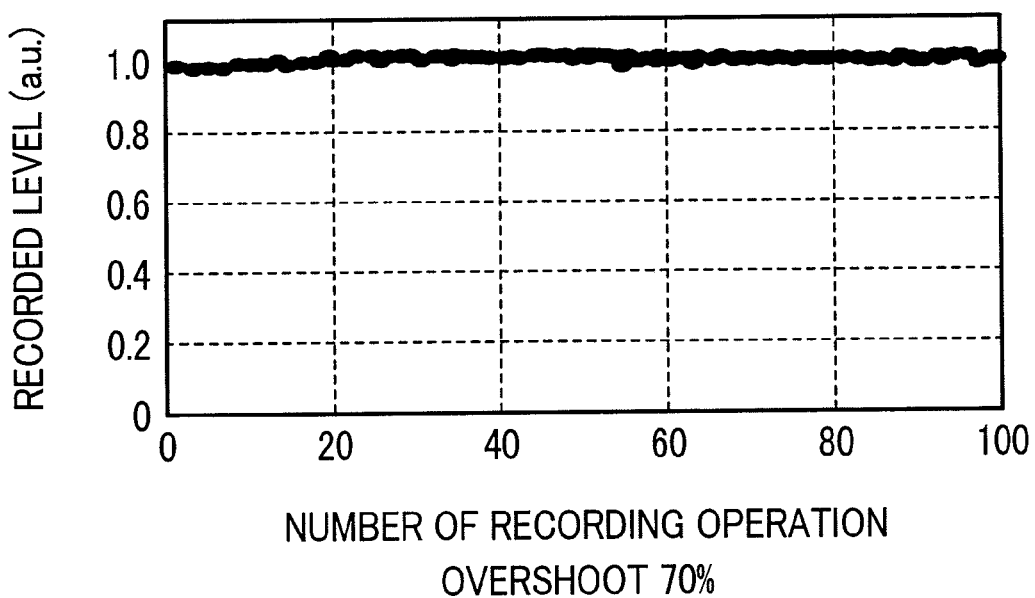
FIG. 20B is a data characteristics graph rating the stability of record (write) operation (when overshoot is 79%) of the seventh embodiment.

FIGS. 20A and 20B are data characteristics graphs rating the stability of write operation in a magnetic disk drive mounted with the single pole type thin film magnetic head with multilayer main pole of the present invention.

Figure 21:
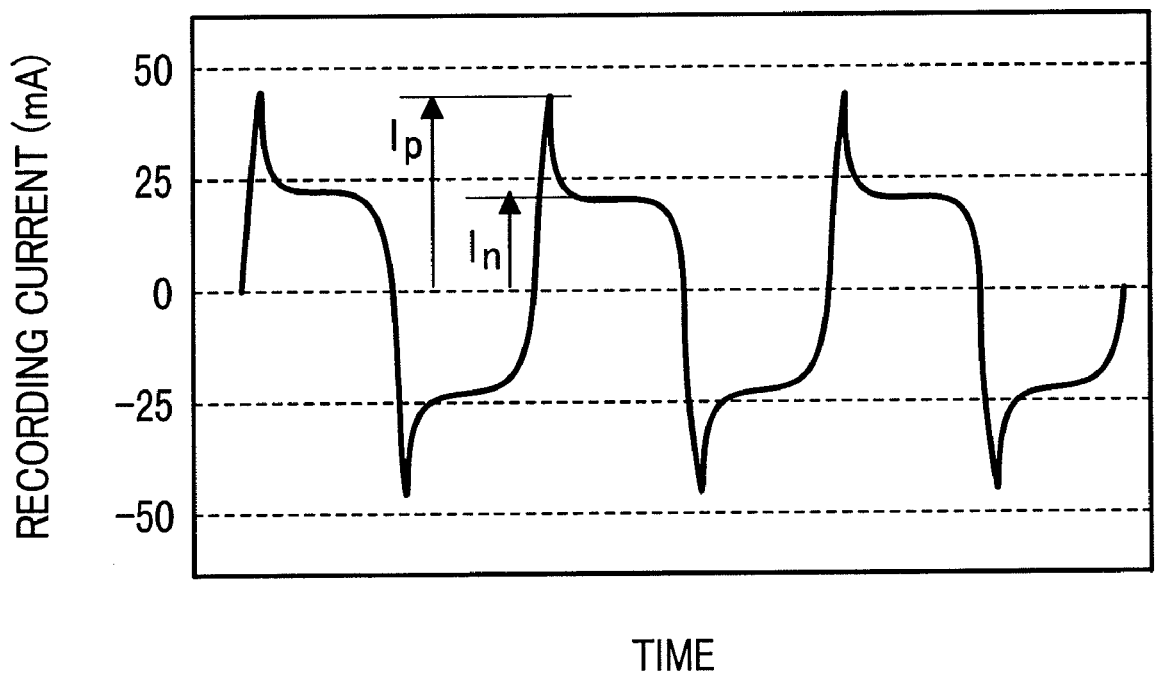
FIG. 21 is a graph illustrating the overshoot.

FIG. 20A shows the case when set to a write current overshoot of 130 percent. FIG. 20B shows the case when set to a write current overshoot of 70 percent. The overshoot referred to here is an indicator shown for (lp−ln)/ln×100 utilizing the electrical current value ln of the flat section and the peak current lp shown along with the write waveform in FIG. 21.

When the overshoot is set to a large value as shown in (A), there are large fluctuations in the write (record) level regardless of whether a multilayer pole is used and erase-after-write occurs often. However, when the overshoot is set to a small value as shown in (B), then it can be seen that erase-after-write does not occur at all.

The overshoot value is generally set in the circuit 127 of the magnetic disk device. However since overshoot is an indicator strongly related to write performance at high frequencies, not only the head, but also the medium characteristics (properties) and functions of the drive overall must ultimately be decided. To establish these, an overshoot value with a wide a range as allowable in the thin film magnetic head of the present invention is essential for attaining reliability and performance in the magnetic disk drive.

Figure 22:
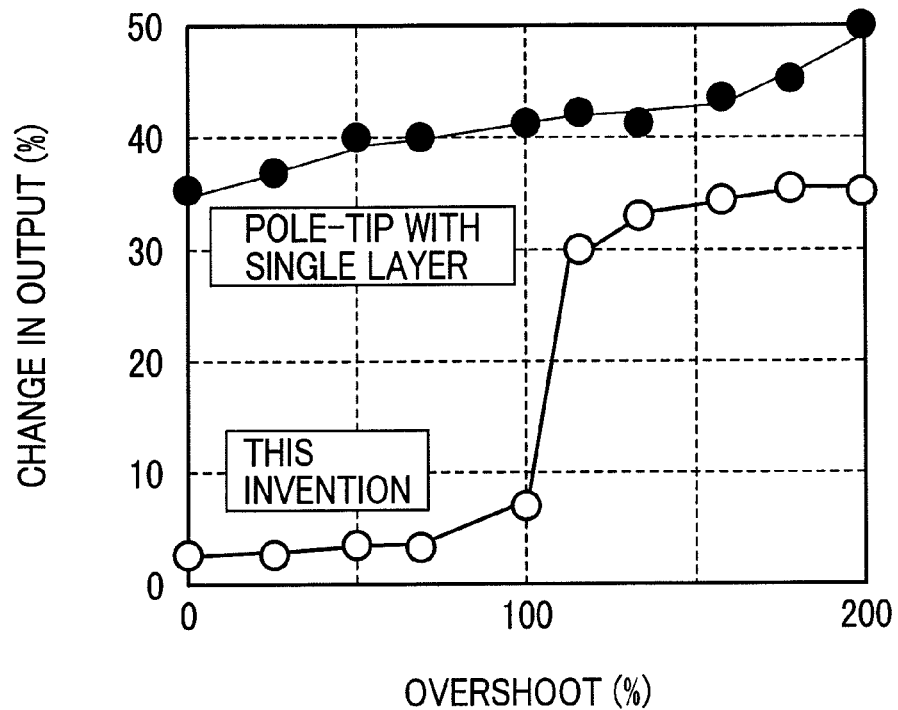
FIG. 22 is a data characteristics graph showing the relation of the overshoot value and the signal fluctuation width of the seventh embodiment.
Figure 23:
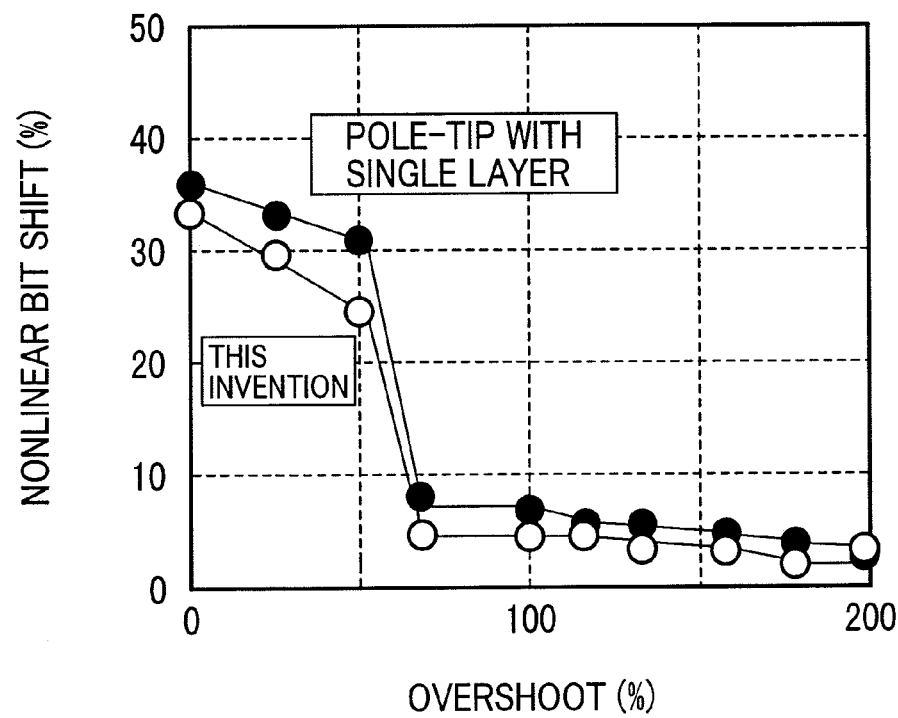
FIG. 23 is a data characteristics graph showing the relation of the overshoot for nonlinear bit shift in the seventh embodiment.

FIG. 22 is a graph showing the changes in output width when the overshoot values were changed. As described above, the change in output width expresses the extent of erase-after-write. An example of a single-layer pole used in the thin film magnetic head is also shown at the same time for reference. As can be understood from this graph, a large erase-after-write is constantly occurring in the single layer of the present embodiment except for the times when there is an extremely small overshoot. However, it can be seen that in the multilayer pole of the present invention, erase-after-write is effectively suppressed within a range of 100 percent. Next, FIG. 23 is a data characteristics graph showing the relation of nonlinear bit shift to overshoot as an important indicator for showing overall performance of the magnetic recording system and therefore the magnetic disk drive.

It can be seen that an overshoot of 50 percent or more is required regardless of whether the pole is a single layer or multilayer. The threshold of 50 percent in this case is largely determined by the performance of the medium and record (write) current transfer path characteristics. Clearly however, it is effective at least in the present invention for achieving both suppression of erase-after-write and suppression of nonlinear bit shift.

In the present embodiment, the overshoot which is an essential element for determining magnetic disk drive performance is strongly related to stable write operation, and the invention is indispensable for achieving both drive performance and reliability. Different changes (number of layers, material, layer thickness, etc.) and variations in the structure of the magnetic pole may be utilized and can achieve almost the same effect as the invention if within the scope and coverage of the present invention.

The present invention is capable of suppressing erasure-after-write while maintaining a sufficiently large magnetic recording field even on narrow tracks of 200 nanometers or less by utilizing a magnetic pole width for high recording densities exceeding 100 gigabits per square inch, and is further capable of supplying a high performance and high reliability perpendicular thin film magnetic recording head at a low cost. Further, a high reliability magnetic disk drive can be achieved by combining this type of thin film perpendicular magnetic head of the present invention with a magnetic recording medium comprising a flux keeper layer.

What is claimed is:

1. A magnetic disk drive including a magnetic recording medium, a perpendicular magnetic recording head, and a positioning device for positioning the perpendicular magnetic recording head over the magnetic recording medium, said magnetic disk drive supplying write electrical current to the perpendicular magnetic recording head, said perpendicular magnetic recording head comprising:
　a main pole including a magnetic multilayer composed of a high saturation flux density layer and a low saturation flux density layer;
　a return path for supplying a magnetic flux to the main pole; and
　a conductive coil for excitation of the return path,
　wherein:
　　the high saturation flux density layer contains an Fe—Co alloy,
　　the width of the main pole is 200 nanometers or less,
　　the direction of magnetization in a pair of the high saturation flux density layers of the magnetic multilayer facing each other with respect to the low saturation flux density layer is oriented in an antiparallel arrangement by magnetostatic coupling between magnetization of the high saturation flux density layers, and
　　the number of turns of the coil of a write element is less than or equal to 4.

2. A magnetic disk drive including a magnetic recording medium, a perpendicular magnetic recording head, and a positioning device for positioning the perpendicular magnetic recording head over the magnetic recording medium, said magnetic disk drive supplying write electrical current to the perpendicular magnetic recording head, said perpendicular magnetic recording head comprising:
　a main pole including a magnetic multilayer composed of a high saturation flux density layer and a low saturation flux density layer;
　a return path for supplying a magnetic flux to the main pole; and
　a conductive coil for excitation of the return path,
　wherein:
　　the width of the main pole is 200 nanometers or less,
　　the thickness of the low saturation flux density layer is within a range of 0.5 nanometer to 5.0 nanometers,
　　the thickness of the high saturation flux density layer is within a range of 10 nanometer to 50 nanometers,
　　the direction of magnetization in a pair of the high saturation flux density layers of the magnetic multilayer facing each other with respect to the low saturation flux density layer is oriented in an antiparallel arrangement by magnetostatic coupling between magnetization of the high saturation flux density layers, and the number of turns of the coil of a write element is less than or equal to 4.

3. The magnetic disk drive according to claim 1, wherein said main pole is arranged at the trailing side of the return path, and said perpendicular magnetic recording head further comprises:
a yoke arranged between the main pole and the return path; and
a main pole taper section arranged between the yoke and the main pole,
wherein the number of turns of the coil of the write element is greater than or equal to 3.

4. The magnetic disk drive according to claim 2, wherein said main pole is arranged at the trailing side of the return path, and said perpendicular magnetic recording head further comprises:
a yoke arranged between the main pole and the return path; and
a main pole taper section arranged between the yoke and the main pole,
wherein the number of turns of the coil of the write element is greater than or equal to 3.

5. A magnetic disk drive including a magnetic recording medium, a thin film perpendicular magnetic recording head, a positioning device for positioning the thin film perpendicular magnetic recording head over the magnetic recording medium, and a device control portion for supplying a write electrical current to the thin film perpendicular magnetic recording head and encoding write data, said thin film perpendicular magnetic recording head comprising:
a main pole including a magnetic multilayer composed of a high saturation flux density layer and a low saturation flux density layer;
an auxiliary pole;
a return path for supplying a magnetic flux to the main pole; and
a conductive coil for excitation of the main pole and the return path,
wherein:
the width of the main pole is 200 nanometers or less,
the thickness of the low saturation flux density layer is within a range of 0.5 nanometers to 5.0 nanometers,
the thickness of the high saturation flux density layer is within a range of 10 nanometers to 50 nanometers, and
overshoot of the write electrical current is controlled less or equal to 100% by the device control portion.

6. A magnetic disk drive according to claim 5, wherein the overshoot of the write electrical current is controlled within a range of 50% to 100% by the device control portion.

7. A magnetic disk drive according to claim 5, wherein the magnetic recording medium comprises:
a recording layer comprising a ferromagnetic material with high coercivity and which retains written data through its uniaxial magnetic anisotropy; and
a flux keeper layer with low coercivity and which contributes to the generation of a magnetic recording field through interaction with a write element.

8. A magnetic disk drive including a magnetic recording medium, a thin film perpendicular magnetic recording head, a positioning device for positioning the thin film perpendicular magnetic recording head over the magnetic recording medium, and a device control portion for supplying a write electrical current to the thin film perpendicular magnetic recording head and encoding write data, said thin film perpendicular magnetic recording head comprising:
a main pole including a magnetic multilayer composed of a high saturation flux density layer and a low saturation flux density layer;
an auxiliary pole;
a return path for supplying a magnetic flux to the main pole; and
a conductive coil for excitation of the main pole and the return path,
wherein:
the width of the main pole is 200 nanometers or less,
the high saturation flux density layer contains an Fe—Co alloy,
the direction of magnetization in a pair of the high saturation flux density layers of the magnetic multilayer facing each other by way of the low saturation flux density layer is oriented in an antiparallel arrangement, and
overshoot of the write electrical current is controlled less or equal to 100% by the device control portion.

9. A magnetic disk drive according to claim 8, wherein the overshoot of the write electrical current is controlled within a range of 50% to 100% by the device control portion.

10. The magnetic disk drive according to claim 8, wherein the magnetic recording medium comprises:
a recording layer comprising a ferromagnetic material with high coercivity and which retains written data through its uniaxial magnetic anisotropy; and
a flux keeper layer with low coercivity and which contributes to the generation of a magnetic recording field through interaction with a write element.

* * * * *